United States Patent
Baxter et al.

(10) Patent No.: US 7,299,161 B2
(45) Date of Patent: Nov. 20, 2007

(54) DECORRELATION OF SIGNALS

(75) Inventors: Paul Daniel Baxter, Malvern (GB); John Graham McWhirter, Malvern (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/536,709

(22) PCT Filed: Nov. 26, 2003

(86) PCT No.: PCT/GB03/05168

§ 371 (c)(1), (2), (4) Date: May 27, 2005

(87) PCT Pub. No.: WO2004/051501

PCT Pub. Date: Jun. 17, 2004

(65) Prior Publication Data

US 2006/0020428 A1   Jan. 26, 2006

(30) Foreign Application Priority Data

Dec. 3, 2002 (GB) .................................. 0228163.2

(51) Int. Cl.
  *G06F 3/01* (2006.01)

(52) U.S. Cl. ............... 702/196; 702/189; 702/190; 702/197

(58) Field of Classification Search .......... 702/127, 702/189–191, 196–198; 342/14, 99; 370/342; 375/148; 379/406.08; 381/23; 714/701
See application file for complete search history.

(56) References Cited

U.S. PATENT DOCUMENTS

| 5,802,481 | A | * | 9/1998 | Prieto | 702/190 |
| 5,852,806 | A | * | 12/1998 | Johnston et al. | 704/500 |
| 5,974,181 | A | * | 10/1999 | Prieto | 382/232 |
| 6,128,346 | A | * | 10/2000 | Suarez et al. | 375/254 |
| 6,177,893 | B1 | * | 1/2001 | Velazquez et al. | 341/118 |
| 6,215,422 | B1 | * | 4/2001 | Henry et al. | 341/51 |
| 6,252,535 | B1 | * | 6/2001 | Kober et al. | 341/155 |
| 6,339,390 | B1 | * | 1/2002 | Velazquez et al. | 341/120 |

(Continued)

FOREIGN PATENT DOCUMENTS

GB    2 368 936    5/2002

(Continued)

OTHER PUBLICATIONS

Fekri et al., "Theory of Paraunitary Filter Banks Over Field of Characteristic Two", IEEE, Nov. 2002.*

(Continued)

Primary Examiner—Eliseo Ramos-Feliciano
Assistant Examiner—Felix Suarez
(74) Attorney, Agent, or Firm—McDonnell Boehnen Hulbert & Berghoff LLP

(57) ABSTRACT

A method of strongly decorrelating signals comprising processing input signals to determine delay and rotation parameters which implement at least one elementary paraunitary matrix. The parameters transform the input signals into output signals with improvement in a measure of strong decorrelation. The improvement in the measure of strong decorrelation is then assessed: if it is significant the latest output signals are, designated as input signals and the process is iterated. Iteration continues until the measure of strong decorrelation ceases to improve significantly, at which point the latest output signals are designated as signals decorrelated in a wide sense.

28 Claims, 9 Drawing Sheets

U.S. PATENT DOCUMENTS

| | | | | |
|---|---|---|---|---|
| 6,359,998 | B1* | 3/2002 | Cooklev | 382/100 |
| 6,362,760 | B2* | 3/2002 | Kober et al. | 341/141 |
| 6,426,977 | B1* | 7/2002 | Lee et al. | 375/259 |
| 6,473,013 | B1* | 10/2002 | Velazquez et al. | 341/120 |
| 6,493,399 | B1* | 12/2002 | Xia et al. | 375/296 |
| 6,549,151 | B1* | 4/2003 | Kober et al. | 341/141 |
| 6,792,057 | B2* | 9/2004 | Kabel et al. | 375/346 |
| 6,898,756 | B1* | 5/2005 | Fekri et al. | 714/786 |
| 7,062,430 | B2* | 6/2006 | Zelazo | 704/200.1 |
| 2001/0000216 | A1* | 4/2001 | Kober et al. | 341/155 |
| 2001/0000660 | A1* | 5/2001 | Kober et al. | 341/6 |
| 2004/0042557 | A1* | 3/2004 | Kabel et al. | 375/260 |
| 2004/0120592 | A1* | 6/2004 | Fernandes | 382/240 |
| 2004/0267542 | A1* | 12/2004 | Absar et al. | 704/500 |

FOREIGN PATENT DOCUMENTS

| | | |
|---|---|---|
| WO | WO 02/059772 | 8/2002 |
| WO | WO 02/071256 | 9/2002 |
| WO | WO 03/073612 | 9/2003 |

OTHER PUBLICATIONS

Phoong et al., "Paraunitary Filter Banks Over Finite Fields", IEEE, Jun. 1997.*

Venkataraman et al., "A Comparison of Design Methods for 2-D FIR Orthogonal Perfect Reconstruction Filter Banks", IEEE, Aug. 1995.*

Akkarakaran et al., "Filterbank Optimization with Convex Objectives and the Optimality of Prinicpal Component Forms", IEEE, Jan. 2001.*

Vaidyanathan, "Theory of Optimal Orthonormal Subband Coders", IEEE, Jun. 1998.*

Vaidyanathan et al., "Results on Optimal Biorthogonal Filter Banks", IEEE, Aug. 1998.*

Kirac et al., "Theory and Design of Optimum FIR Compaction Filters", IEEE, Apr. 1998.*

Baxter, "Blind Signal Separation of Convolution Mixtures", Independent Component Analysis: Algorithms, Applications and Extensions, Queen Mary University,(2002).

"IEEE Workshop on Nonlinear and Non-Gaussain Signal Processing (N2SP) held on Jul. 8-9, 2002", Website of IEE, (2002).

Vaidyanathan, "Multitrate Systems and Filter Banks", Multitrate Systems and Filter Banks, pp. 727-729 (1993).

Moreau, et al. "Independence/Decorrelation Measures with Applications to Optimized Orthonormal Represenations", IEEE, pp. 3425-3428 (1997).

McWhirter, et al., "A Novel Technique for Broadband SVD", 12th Annual Adaptive Sensor Array Processing Workshop, (2004).

Baxter, "Blind Signal Separation of Convolution Mixtures", IEEE, pp. 124-128 (2003).

Vaidyanathan, "Theory of Optimal Orthonormal Filter Banks", IEEE, pp. 1487-1490 (1996).

Tsatsanis et al., "Principal Component Filter Banks for Optimal Multiresolution Analysis", IEEE Transactions on Signal Processing, pp. 1766-1777 (1995).

Regalia, et al., "Rational Subspace Estimation Using Adaptive Lossless Filters", IEEE Transactions on Signal Processing, pp. 2392-2405 (1992).

Regalia et al., "Attainable Error Bounds in Multirate Adaptive Lossless Fir Filters", IEEE transactions on Signal Processing, pp. 1460-1463 (1995).

Moulin et al., "Design of Signal-Adapted Fir Paraunitary Filter Banks", IEEE, pp. 1519-1522 (1996).

* cited by examiner

DECORRELATION OF SIGNALS

BACKGROUND OF THE INVENTION (1) Field of the Invention

This invention relates to decorrelation of signals; more particularly it relates to decorrelation of signals that have undergone convolutive mixing, and to a method, an apparatus and a computer program for implementing decorrelation.

(2) Description of the Art

Decorrelation is known: it is a form of signal processing implemented by software running on a computer system and accepting data from sensors after conversion from analogue to digital form. Two assumptions are normally made in decorrelation, stationarity and linearity, and these assumptions are also made in connection with the present invention. Stationarity means that signals and channels in which they mix do not change over a time interval during which mixed signals are sampled. Linearity means that mixtures of signals received by sensors are linear combinations of these signals. More complicated combinations featuring signal products and squares and higher order powers of signals are not considered.

The aim of decorrelation is to remove similarities between input signals, thereby eliminating redundancies. In some circumstances this may lead to recovering the signals as they were prior to mixing, but more usually it is used as a pre-processing step in an unmixing algorithm, or as part of another algorithm such as a data compression algorithm. A common usage is to separate the signals which carry meaningful data from those that arise due entirely to noise in the environment and in a receiver system which detects the signals: such separation may be an end in itself, or it may be used as part of a data compression scheme.

Decorrelation is a process of removing correlations or similarities between signal pairs in a set of signals: correlation of a pair of signals is itself defined mathematically as an integral of the signal pair's product over time. It is important that as little information as possible (preferably none) is destroyed in decorrelation process, as would occur for example if decorrelation led to one of the signals being zeroed. Use of energy preserving transforms for decorrelation avoids information being destroyed and leads to output signals with other useful properties.

If an energy preserving transform is used, it is usually required to recover decorrelated signals in decreasing order of power. This allows data compression techniques and signal/noise subspace separation techniques to be implemented very simply.

Algorithms for decorrelating signals that have been instantaneously mixed are known: they may use either transforms that are energy preserving or those that are not.

Unfortunately, an algorithm which is adequate for decorrelating signals that have been instantaneously mixed cannot cope with more difficult problems. These more difficult problems occur when an output signal from a sensor must be expressed mathematically as a convolution, i.e. a combination of a series of replicas of a signal relatively delayed with respect to one another. It is therefore referred to as the "convolutive mixing" problem.

The approach used in instantaneous algorithms has been extended to the convolutive mixing situation: from this approach it has been inferred that convolutively mixed signals can be decorrelated by the use of an energy preserving technique. This algorithm would accommodate time delays involved in mixing and decorrelation. The criterion to be imposed has however changed: i.e. pointwise decorrelation (as defined later) is no longer sufficient, instead a wider condition involving decorrelation with time delays should be imposed. This will be referred to as wide sense decorrelation, and imposing this property as imposing strong decorrelation.

Instead of the unitary matrix employed in instantaneous algorithms, an algorithm for imposing strong decorrelation by an energy preserving filter employs a paraunitary matrix. As will be described later in more detail, a paraunitary matrix is one which gives the identity matrix when multiplied by its paraconjugate matrix—a polynomial equivalent of a Hermitian conjugate matrix. A possible approach for the strong decorrelation problem is therefore to search for a paraunitary matrix that maximises a measure of the wide sense decorrelation.

In this case, it may be possible to improve on the mere return of signals in decreasing order of power. It may be possible to provide for return of signals in decreasing order of power at each frequency in a set of frequencies. Thus a first signal has more power than other signals at all frequencies and a second signal has more power than all other signals apart from the first at all frequencies etc. This property is called spectral majorisation. Spectral majorisation is useful if the algorithm is to be used for data compression or for separating signal and noise subspaces.

In "Theory of Optimal Orthonormal Filter Banks" ICASSP 1996, P. P. Vaidyanathan discloses a use for filtering techniques where both strong decorrelation and spectral majorisation are necessary, neither being sufficient without the other.

The simplest prior art method of imposing strong decorrelation involves using a multichannel whitening lattice filter. See for example S. Haykin, *Adaptive Filter Theory*, Prentice Hall, 1991, although there are many references for these techniques, based on slightly different algorithms designed with different convergence and stability properties in mind. These techniques were not designed to impose strong decorrelation directly: instead they aim to recover an innovations sequence of the mixed signals. The components of the innovations sequence so produced are strongly decorrelated as a consequence of what they are. However these techniques are not energy preserving, and so are not suitable for use in many scenarios.

In *"Principal Component Filter Banks for Optimal Multiresolution Analysis"*, IEEE transactions on Signal Processing Vol 43 August, 1995, M. K. Tsatsanis and G. B. Giannakis discuss how to find an optimal energy preserving and spectral majorising filter. This reference uses a frequency domain technique to show how an optimal filter can be found if infinite information is held about the signals and no constraint is placed upon the order of the filter. However it does not show either how this can be transferred to a data dependent algorithm, or how the filter can be constrained to a sensible order without losing optimality. However its calculations provide absolute performance bounds, and formed the basis of several of algorithms discussed below.

In *"Multirate Systems and Filter Banks"*, Prentice Hall: Signal Processing Series, 1993, P. P. Vaidyanathan discloses parameterisation of paraunitary matrices in a stage-by-stage decomposition of a paraunitary matrix in $z^{-1}$: here $z^{-1}$ is an operator implementing a delay. Vaidyanathan shows that a product matrix built up from a series of pairs of paraunitary matrix blocks is paraunitary: here, in a pair of blocks, one block represents a delay and the other a 2 by 2 unitary matrix implementing a Givens rotation (see U.S. Pat. No. 4,727,503). Vaidyanathan also shows that a para unitary matrix of degree N, defined later, is a product of N+1 rotations and N one-channel delay operators all implementing the same unit delay.

In "*Attainable Error Bounds in Multirate Adaptive Lossless FIR Filters*", ICASSP 1995, P. A. Regalia and D Huang propose two different eigenvalue-based algorithms for strong decorrelation. Their algorithms are recursive, limited to two input signals and based upon a fixed degree lossless filter with parameters disclosed by Vaidyanathan. It is also necessary to access data from various points internal to the Vaidyanathan decomposition for use in adjusting the parameters: this adds an extra layer of processing complexity.

In "*Rational Subspace Estimation using Adaptive Lossless Filter*" IEEE transactions on Signal Processing Vol 40 October, 1992 P. A. Regalia and P. Loubatton disclose a different algorithm for attempting to impose both strong decorrelation and spectral majorisation. This algorithm is applicable to more than two signals, but it is based upon a deflationary approach where an optimal single signal output is first calculated, and then augmented with other outputs until one of the latter becomes insignificant. Again a fixed degree and fixed order lossless filter is parameterised as disclosed by Vaidyanathan, and the parameters are adjusted according to a stochastic algorithm, which requires information on the data flow inside the Vaidyanathan decomposition.

A different algorithm is proposed in "*Design of Signal-Adapted FIR Paraunitary Filter Banks*" ICASSP 1996 by P. Moulin, M. Anitescu, K. O. Kortanek and F. Potra. This uses a slightly different version of the Vaidyanathan parameterisation with a fixed degree. From the effects of a parameterised filter on one single output channel, this algorithm shows how to convert a problem of maximising power in one channel into a linear semi-infinite programming problem, which has known methods for solution. In effect the algorithm has an objective of achieving both strong decorrelation and spectral majorisation; it has a cost function which is very similar to a known $N_1^0$ cost function to be described in more detail later. However it forces the paraunitary filter to be of a fixed degree, and relies upon a link between parameters and cost function being computationally tractable. For different cost functions this would not be the case.

Gradient descent methods are known which aim to adjust all parameters of a paraunitary matrix or an unmixing filter simultaneously: these methods have another difficulty, i.e. they have parameters linked to any useful measure of independence in a very complex way which does not factorise easily. This means adjusting all parameters at once: it leads to very slow algorithm convergence, which is why none of the algorithms previously mentioned use gradient descent. Gradient descent tends to be avoided in the prior art due to problems with speed and accuracy of convergence.

SUMMARY OF THE INVENTION

It is an object of the invention to provide an alternative method of strongly decorrelating signals.

The present invention provides a method for strong decorrelation of signals which are input, characterised in that it includes the steps of:

a) processing the input signals to determine delay and rotation parameters which implement at least one elementary paraunitary matrix and transform the input signals into output signals to obtain improvement in a measure of strong decorrelation;

b) assessing the improvement in the measure of strong decorrelation, and if it is significant designating the output signals as input signals and iterating step a) and this step b);

c) if the improvement is not significant designating the output signals as signals decorrelated in a wide sense.

The invention provides a technique for wide sense decorrelation of signals which have been convolutively mixed, even if mixed using unknown filters. It is suitable, for example, for signals which have undergone multipath reflection, or acoustic signals in a reverberant environment. It is believed that the method of the invention is more reliable and requires less calculation than any alternative currently known. By virtue of use of an elementary paraunitary matrix, decorrelation is carried out using an energy preserving transform, and examples of the invention may (not necessarily but if required) impose spectral majorisation on the signals as well as imposing wide sense decorrelation.

To transform the input signals, the method of the invention may determine in step a) delay and rotation parameters which characterise a single elementary paraunitary matrix. It may include producing a paraunitary matrix by cumulatively multiplying successive elementary paraunitary matrices produced by iterating step a).

The range of signal delay parameters may be a set of discrete delay vectors, and the delay and rotation parameters may be determined by generating a respective version of the input signals delayed by each delay vector in the set, and for each version finding rotation parameters which at least approach producing maximisation of the output signals' strong decorrelation. The rotation parameters which at least approach producing maximisation of the output signals' strong decorrelation may be determined using an algorithm for instantaneous decorrelation. The at least one elementary paraunitary matrix may implement at least one leading delay, rotation and terminal delay.

The method may involve n input signals where n is an integer greater than 2, the range of signal delay parameters being a set of n-element delay vectors and the range of signal rotation parameters being a set of n(n−1)/2 angle parameters. Step a) may comprise determining delay and rotation parameters which implement at least one elementary paraunitary matrix providing for rotation of a pair of input signals and relative delay of the or as the case may be each other input signal. The n input signals may be associated with respective channels, step a) having n(n−1)/2 successive stages each associated with at least one respective elementary paraunitary matrix and each providing for rotation of signals associated with a respective pair of channels and provision of relative delay associated with the or as the case may be each other channel, the first stage being arranged to process the input signals and the or as the case may be each subsequent stage being arranged to receive signals processed in the respective preceding stage.

The method of the invention may involve a set of n input signals where n is an integer greater than 2, characterised in that it comprises:

a) producing n(n−1)/2 replicas of the set of input signals, b) in each replica selecting a respective signal pair differing to that selected in other replicas, and c) the step of processing the input signals to determine delay and rotation parameters being carried out for each replica and comprising i) determining delay and rotation parameters which implement at least one elementary paraunitary matrix providing for rotation of the respective selected signal pair only, and ii) determining which replica when transformed by the associated at least one elementary paraunitary matrix gives rise to transformed signals corresponding to improvement in a measure of strong decorrelation by at least a major part of a maximum extent obtainable over the replicas and designating these transformed signals as output signals.

In another aspect, the present invention provides computer apparatus for strong decorrelation of signals, the apparatus being programmed for reception of input signals, characterised in that the apparatus is also programmed:
a) to process the input signals to determine delay and rotation parameters which implement at least one elementary paraunitary matrix and transform the input signals into output signals to obtain improvement in a measure of strong decorrelation;
b) to assess the improvement in the measure of strong decorrelation, and if it is significant designate the output signals as input signals and iterating a) and b);
c) if the improvement is not significant to designate the output signals as signals decorrelated in a wide sense.

In a further aspect, the present invention provides a computer programme for implementing strong decorrelation of signals input to computer apparatus, characterised in that it has instructions for controlling computer apparatus:
d) to process the input signals to determine delay and rotation parameters which implement at least one elementary paraunitary matrix and transform the input signals into output signals to obtain improvement in a measure of strong decorrelation;
e) to assess the improvement in the measure of strong decorrelation, and if it is significant designate the output signals as input signals and iterating a) and b);
f) if the improvement is not significant to designate the output signals as signals decorrelated in a wide sense.

The apparatus and computer programme aspects of the invention may include features equivalent to those mentioned above in connection with the method of the invention.

DESCRIPTION OF THE FIGURES

In order that the invention might be more fully understood, an embodiment thereof will now be described, by way of example only, with reference to the accompanying drawings, in which.

DESCRIPTION OF A PREFERRED EMBODIMENT

Figure 1:
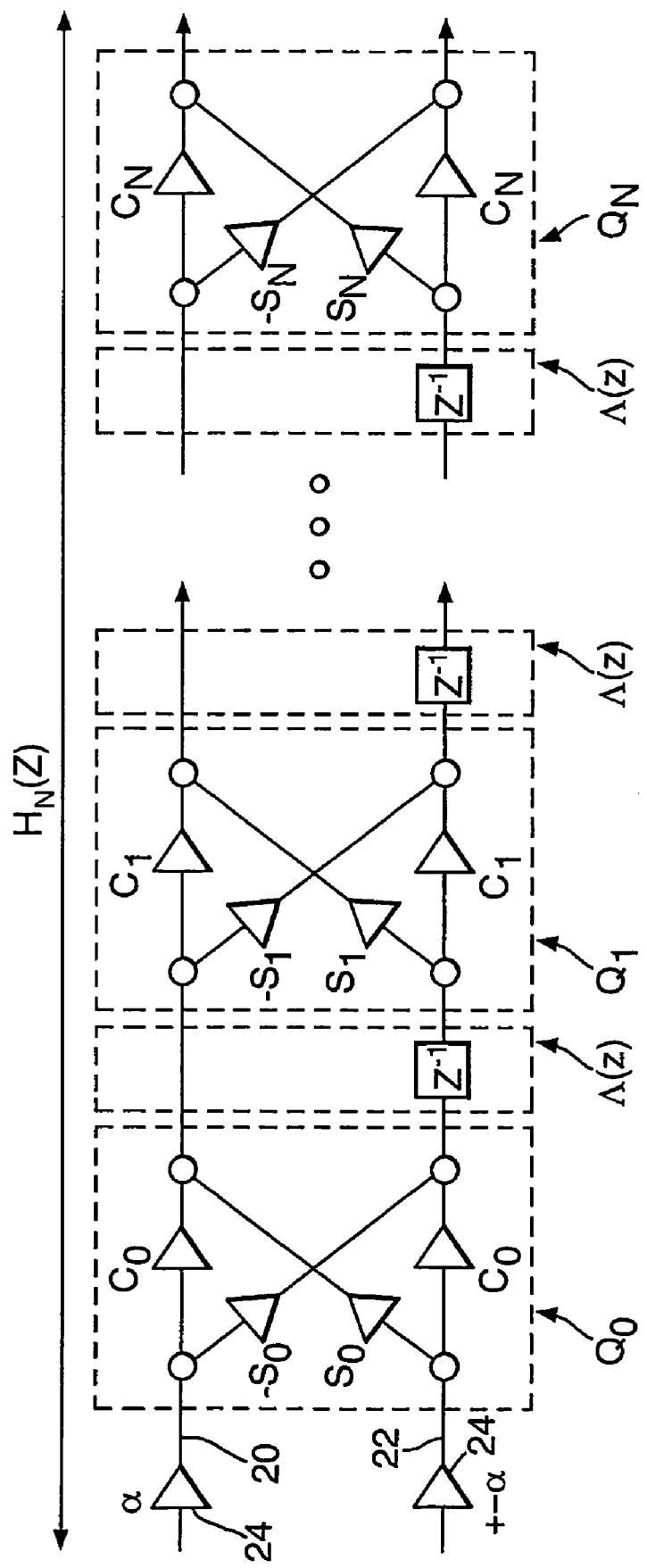
FIG. 1 illustrates decomposition of a paraunitary matrix into degree-one paraunitary matrices in a prior art convolutive unmixing process.

The present invention is arrived at by modifying and extending the prior art of both instantaneously decorrelating signals and of strongly decorrelating signals: this prior art will first be discussed in more detail to enable the invention to be better understood.

Wide sense decorrelation is based entirely upon second order properties of data. The equality at (1) below holds if and only if the instantaneous decorrelation property holds for the pair of signals $x_1$, $x_2$.

$$E(x_1 x_2) = E(x_1) E(x_2) \tag{1}$$

Here E is the expectation operator, and a product $x_1 x_2$ represents the signal obtained by multiplying each sample of a signal $x_1$ by a respective sample of a signal $x_2$ having the same sample time: this defines pointwise decorrelation of a pair of signals.

Expectations can be estimated from sampled signals to determine whether or not Equation (1) holds for sampled signals. If Equation (1) holds for all signal pairs then the signals are referred to as being decorrelated.

Mathematically, instantaneous mixing of two signals from sources (e.g. loudspeakers) and their receipt by two receivers can be represented as follows:

$$x_1(t) = h_{11} s_1(t) + h_{12} s_2(t)$$

$$x_2(t) = h_{21} s_1(t) + h_{22} s_2(t) \tag{2}$$

Here loudspeaker outputs (original signals) reaching the two receivers at time (t) are represented by $s_1(t)$ and $s_2(t)$: t is in units of an interval between successive digital signal samples (clock cycles), and has integer values 1, 2 etc. The path from each loudspeaker to each receiver and the receiver's reception characteristics give rise to a constant channel modulation. In the instantaneous mixing problem, this modulation is represented by multiplier terms $h_{ij}$, where i=1 or 2 indicates first or second receiver and j=1 or 2 indicates first or second loudspeaker respectively. First and second loudspeaker signals at time (t) are represented by $x_1(t)$ and $x_2(t)$. Each receiver signal is the sum of two loudspeaker signals, each multiplied by a respective coefficient. These equations can be represented more compactly in matrix-vector format as:

$$x(t) = Hs(t) \tag{3}$$

where s is a 2 by 1 element vector of two loudspeaker signals, H is a 2 by 2 element mixing matrix and x is a 2 by 1 element vector of two received signals, one at each receiver. H is referred to as the mixing matrix because it has matrix elements (coefficients) that operate on the loudspeaker signals and mix them to form the received signals. The sizes of s, x, and H will increase if more than two signals or more than two sensors are involved. As previously mentioned, algorithms for solving the instantaneous decorrelation problem produced by Equation (3) exist in the prior art.

Mathematically, a correlation matrix R of a set of signals expressed as a vector x can be defined as:

$$R = E((x - E(x))(x - E(x))^H) \tag{4}$$

where E(x) is the expectation of x, that is the mean of x over time and the superscript index H means a Hermitian conjugate. In Equation (4) E(x) is subtracted from x, which is the first step in all processing that follows. However, to simplify notation it is usually assumed that signals have zero mean values, and this assumption will be used in what follows.

This means that Equation (4) simplifies to $R=E(xx^H)$. However, it is not necessary for signals to have zero mean values in order for the invention to be effective.

To impose decorrelation upon mixed signals, it is necessary to force the correlation matrix R to have off-diagonal coefficients which are equal to zero. This is the instantaneous decorrelation problem. It can be done, for example, by ensuring that a correct amount of received signal 1 is subtracted from received signal 2 to ensure that the resulting output is decorrelated from received signal 1. This is repeated for all other signals, producing a set of outputs decorrelated with received signal 1, which is then defined as an output 1. The remaining outputs are then decorrelated with each other by repeating this procedure for them. It is equivalent to obtaining decorrelated signals x' by pre-multiplying signals x by a lower triangular matrix L, i.e. a matrix having all above diagonal coefficients equal to zero. Instantaneously decorrelated signals are designated x' and have a correlation matrix R' defined by:

$$R'=E(x'x'^H)=E(Lxx^H L^H)=D \tag{5}$$

Here the new correlation matrix is shown as D, which is diagonal and positive semi-definite.

In order that instantaneous decorrelation algorithms be capable of imposing second order independence, a relative propagation delay between a time sample of a signal from a signal source reaching two separate sensors must representable as a simple phase shift applied to a signal received by one of the sensors. For N sensors this becomes N−1 phase shifts. If this condition does not hold, channels from signal sources to sensors may be convolutive and in consequence instantaneous decorrelation algorithms will fail to impose second order independence.

One-channel convolution and its analysis using z-transforms will now be considered. In a single signal, single receiver arrangement, the loudspeaker signal consists of a series of values indexed by the respective times t at which they were obtained and denoted by s(t). The loudspeaker signal passes through a channel and is received by the receiver that detects another series of values, x(t). The link between s(t) and x(t) may not be a simple multiplication as in instantaneous mixing. Instead x(t) may consist of a linear sum of several of earlier values of s(t). This is known as a convolution, and is shown by:

$$x(t) = h \otimes s(t) = \sum_{k=0}^{p} h(k)s(t-k) \tag{6}$$

where $\otimes$ is referred to as a "convolution operator". Generation of a linear sum of values of s(t) may occur because signals pass through an irregular channel which spreads them out. It may also occur from multi-path effects, i.e. when there is more than one path a signal can take to reach a receiver and the paths have differing propagation times. Instantaneous mixing is a simple case of convolutive mixing.

Convolution is more complex and involves more algebra than simple multiplication by a coefficient. However it is possible to reduce it to a multiplication by the use of z-transforms as follows. The z-transforms of s, x and h are:

$$s(z)=s(0)+s(1)z^{-1}+s(2)z^{-2}+s(3)z^{-3}+\ldots$$

$$x(z)=x(0)+x(1)z^{-1}+x(2)z^{-2}+x(3)z^{-3}+\ldots$$

$$h(z)=h(0)+h(1)z^{-1}+h(2)z^{-2}+\ldots+h(p)z^{-p} \tag{7}$$

Here $z^{-1}$ is referred to as a delay operator as mentioned above. The z-transform of a signal expressed as a time series of sample values is a polynomial in $z^{-1}$. Given the form of the z-transform, its polynomial coefficients enable recovery of the original signal. When in their z-transform forms, the convolution of s by h as shown in Equation (6) becomes a multiplication of two polynomials. Thus:

$$x(z)=h(z)s(z) \tag{8}$$

Convolutive mixing may be addressed by combining instantaneous mixing as per Equation (1) with the more complicated approach of Equations (6) to (8). This deals with a plurality of sources and a plurality of receivers with intervening channels which are convolutive. Thus for the two-signal, two-receiver case the following expressions for received signals can be written:

$$x_1(t)=h_{11}\otimes s_1(t)+h_{12}\otimes s_2(t)$$

$$x_2(t)=h_{21}\otimes s_1(t)+h_{22}\otimes s_2(t) \tag{9}$$

In the matrix-vector notation of Equation (3), and using the z-transform notation of Equations (7) and (8), Equation (9) can be written simply as:

$$x(z)=H(z)s(z) \tag{10}$$

Here s(z) is a 2 by 1 coefficient vector formed from z-transforms of loudspeaker outputs. H(z) is a 2 by 2 coefficient polynomial mixing matrix and x(z) is the 2 by 1 vector formed from z-transforms of received signals. Again if more than two loudspeakers and/or receivers are present, the sizes of s(z), x(z) and H(z) increase accordingly.

H(z) is called a polynomial mixing matrix because it represents mixing of signals: its coefficients are polynomials in $z^{-1}$. It may also be considered to be a polynomial in $z^{-1}$ with coefficients which are matrices. It is found one coefficient at a time by taking z-transforms of individual loudspeaker/receiver channels. For future convenience, the order and degree of a polynomial matrix will now be defined. The order of a polynomial matrix is the greatest power to which $z^{-1}$ is raised in the matrix. The degree of a polynomial matrix is the smallest number of delays necessary to implement it as a filter. It is always at least the same size as the order but may be greater.

The instantaneous decorrelation problem only deals with removing correlation between the signals with no time delays applied to them. In order to impose wide sense decorrelation the measure of decorrelation has to operate across time delays. That is, to be strongly decorrelated, the correlation between two signals has to be zero when any time delay is applied to one of the signals. This can be written mathematically as:

$$R(d)=E(x(t)x(t-d)^H))=D(d)\forall d\in(\ldots-2,-1,0,1,2,\ldots) \tag{11}$$

where $\forall d\in(\ldots-2,-1,0,1,2,\ldots)$ means all values of delay d (in units of a time interval between successive signal samples) in the set of all positive and negative whole numbers, and D(d) is a diagonal matrix (all off-diagonal coefficients zero) for all values of d. It is possible to put Equation (11) into z-transform form as follows:

$$R(z)=E(x(z)\tilde{x}(z))=D(z) \tag{12}$$

where D(z) is a diagonal polynomial matrix. Equation (12) introduces the concept of a paraconjugate $\tilde{x}(z)$ of a polynomial matrix x(z) denoted by a tilde above the matrix symbol $\tilde{x}$. It means combined operations of transposition and conjugation (as in the Hermitian operator) and the substitution of 1/z* for z. Paraconjugation is an extension of the Hermitian operator to polynomial matrices.

To achieve wide sense decorrelation it is necessary to force all off-diagonal terms of a polynomial correlation matrix to become the zero polynomial, i.e. the polynomial in $z^{-1}$ having all its coefficients equal to zero. No constraints are put upon the polynomial functions of the matrix on its diagonal. Thus:

$$R'(z) = \begin{bmatrix} \sigma_1(z) & 0 \\ 0 & \sigma_2(z) \end{bmatrix} \quad (13)$$

The unit polynomial is the polynomial that has zero coefficients for all powers of $z^{-1}$ except for $z^0$ which has unity as its coefficient. In the prior art a multichannel lattice filter, see e.g. S. Haykin, "*Adaptive Filter Theory*", Prentice Hall, 1991, imposes strong decorrelation while ensuring that the diagonal terms of the polynomial correlation matrix are the same by forcing them all to be the unit polynomial. This whitens the signals.

The polynomial correlation matrix of the signals x(z) is given by Equation (12) above. A multichannel lattice filter transforms these to obtain a matrix of strongly decorrelated and whitened signals x'(z). These signals have the property that their correlation matrix R'(z) is the identity polynomial matrix I, symbolically:

$$R'(z) = E(x'(z)\tilde{x}'(z)) = I \quad (14)$$

The fact that this method imposes the whitening condition upon the signals means that it carries out more calculation than is necessary and has not necessarily used an energy preserving transform. It can also lead to difficulties when original signals driving the mixing were not white, or when mixing nulls some of their frequency components, as it whitens the outputs and thus amplifies the noise in those frequencies that were nulled.

Instantaneous algorithms that use energy preserving transforms achieve decorrelation by the use of unitary matrices. These are energy preserving, and are defined as those matrices that when multiplied by their Hermitian conjugate give the identity. The extension of the Hermitian operator to the space of polynomial matrices is the operation of paraconjugation. This leads to the definition of paraunitary matrices as those polynomial matrices that give the identity matrix when multiplied by their paraconjugate. Symbolically H(z) is a paraunitary matrix if and only if H(z) $\tilde{H}(z) = \tilde{H}(z)H(z) = I$.

Paraunitary matrices are energy preserving and, more strongly, are energy preserving at all frequencies. This means that if decorrelation is achieved by the use of paraunitary matrices, the problems of whitening mentioned above are avoided.

As previously mentioned, the Vaidyanathan reference discloses parameterisation of the space of all paraunitary matrices. This gives a stage-by-stage decomposition of a paraunitary matrix in $z^{-1}$. The parameterisation is illustrated in FIG. 1 for a two-channel case. It comprises a series of N+1 rotation blocks $Q_0, Q_1, \ldots Q_N$, adjacent pairs of these blocks being separated by individual delay blocks $\Lambda(z)$ which are all alike. Upper and lower signal channels 20 and 22 pass through all the blocks. Amplifiers 24 indicate channel input signal scaling factors $\alpha$, of which the upper channel factor is positive and the lower channel factor is positive or negative as indicated by "+−" before "$\alpha$".

Each of the rotation blocks $Q_0$ to $Q_N$ implements a respective 2 by 2 unitary matrix which itself implements a Givens rotation (see U.S. Pat. No. 4,727,503): a Givens rotation is a rotation parameterised by a single rotation angle $\theta$. In the first rotation block $Q_0$, a signal in the lower channel 22 is multiplied by Givens rotation parameters $s_0$ and $c_0$; a signal in the upper channel 20 is multiplied by Givens rotation parameters $-s_0$ and $c_0$; $s_0$ and $c_0$ are respectively the sine and cosine of the rotation angle $\theta$ implemented by the block $Q_0$. Each $c_0$ product is summed with the $s_0$ or $-s_0$ product from the other channel to provide a sum which passes along the respective channel 20 or 22 to the next block $\Lambda(z)$. This next block $\Lambda(z)$ delays the signal in the lower channel 22 with respect to that in the upper channel 20. This procedure is then repeated in subsequent rotation block $Q_1$ to $Q_N$, with equal intervening delays $\Lambda(z)$ in the lower channel 22.

The rotation blocks $Q_0$ to $Q_N$ and delays $\Lambda(z)$ are themselves paraunitary, and so their product is a matrix which is also paraunitary. Vaidyanathan proved that any finite degree N paraunitary matrix can be expressed in this form. Thus apart from a scalar factor, any finite degree paraunitary matrix can be expressed as follows:

$$H_N(z) = Q_N \ldots \Lambda(z) Q_1 \Lambda(z) Q_0 \quad (15)$$

where N is the degree of the paraunitary matrix. Thus a paraunitary matrix $H_N(z)$ of degree N is the product of N+1 Givens rotations and N one-channel delay operators of equal delays, as shown by the concatenated stages in FIG. 1.

However, there is a difficulty with using Vaidyanathan parameterisation, a simple example of which is given here: consider signals which form an independent identically distributed (iid) time series. Assume these signals have been mixed by a paraunitary mixing matrix. Let the paraunitary mixing matrix have degree 1 and be formed, using Vaidyanathan parameterisation, as:

$$H_N(z) = Q_1 \Lambda(z) Q_0 \quad (16)$$

$$= \begin{bmatrix} 1 & 0 \\ 0 & 1 \end{bmatrix} \begin{bmatrix} 1 & 0 \\ 0 & z^{-1} \end{bmatrix} \begin{bmatrix} \cos(\theta_0) & \sin(\theta_0) \\ -\sin(\theta_0) & \cos(\theta_0) \end{bmatrix}$$

i.e. the last of the two Givens rotations (within the left hand pair of square brackets) is in fact the identity. It has been discovered in accordance with the invention that attempts to impose strong decorrelation on signals mixed by $H_N(z)$ should begin by undoing the delay, not by applying a rotation. However, in applying a single block type approach, the first step is to try to find an appropriate rotation to apply, even though one is not needed. This superfluous rotation is very difficult for later blocks to undo, and its application can introduce more correlation between the signals, which is precisely the opposite of the required decorrelation.

The present invention is intended to overcome the difficulties indicated above, and to avoid superfluous calculations. It has similarities with Vaidyanathan's parameterisation but unlike the latter it employs variable delays not necessarily confined to one channel and not necessarily equal; moreover it does not force a rotation to be applied when there is little or nothing to gain, and allows arbitrarily sized paraunitary matrices to be constructed.

Figure 2:
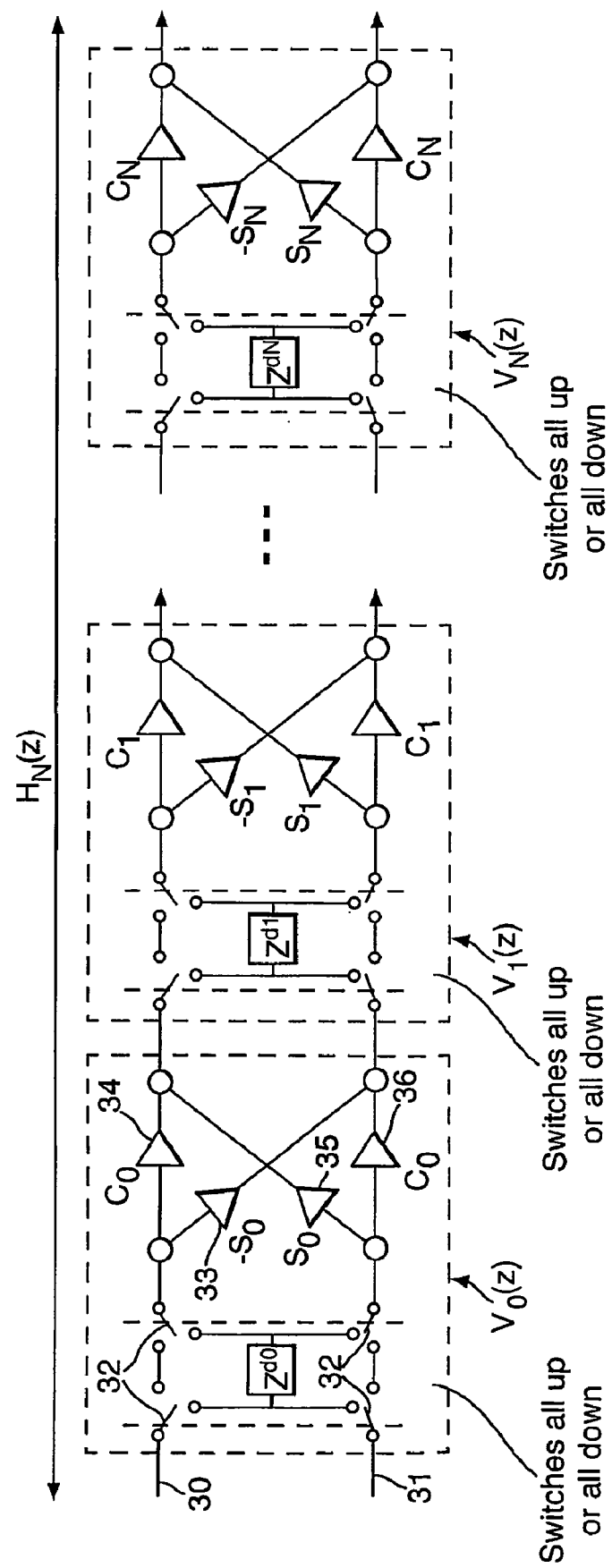
FIG. 2 is a schematic block diagram of decomposition of a paraunitary matrix into elementary paraunitary matrices in a convolutive wide sense decorrelation process of the invention.

FIG. 2 illustrates the construction of a paraunitary matrix $H_N(z)$ as a product of N+1 elementary paraunitary matrices in accordance with the invention. An elementary paraunitary matrix is an expression coined for the purposes of the present invention: it is defined as a polynomial matrix which represents applying a set of delays to the signals, followed by a single unitary transformation (rotation); as will be described later in more detail, this definition may optionally include the rotation being followed by a further set of delays (omitted in the present example). In FIG. 2 and as in FIG. 1, for the sake of simplicity, only the two-channel case is shown as indicated by upper and lower channels 30 and 31. Each of a set of dotted line blocks $V_i(z)$ (i=0, 1, to N) represents a respective single elementary paraunitary matrix that implements a respective delay $d_i$ followed by a Givens rotation. N+1 of the blocks $V_i(z)$ are used to make up the paraunitary matrix $H_N(z)$.

Each of the blocks $V_0(z)$ to $V_N(z)$ implements a respective 2 by 2 elementary paraunitary matrix which itself implements a Givens rotation. In the first block $V_0(z)$, signals in the upper and lower channels 30 and 31 pass into a matrix of four ganged single pole double throw switches 32 controlling routing or otherwise via a delay cell $Z^{d0}$. The switches 32 are all either in the UP position or in the DOWN position: when DOWN, upper channel signals are delayed at $Z^{d0}$ but lower channel signals are not, and when UP the reverse is the case. This enables either channel 30 or 31 to be delayed relative to the other.

On leaving the switches 32, an upper channel signal is multiplied by Givens rotation parameters $-s_0$ and $c_0$ at amplifiers 33 and 34 respectively. Similarly, on leaving the switches 32, a lower channel signal is multiplied by Givens rotation parameters $s_0$ and $c_0$ at amplifiers 35 and 36 respectively. Here $s_0$ and $c_0$ are respectively the sine and cosine of a rotation angle $\theta_0$ implemented by the block $V_0(z)$. Each $c_0$ product is summed with the $s_0$ or $-s_0$ product involving the signal from the other channel: this provides sums, which pass along respective channels 30 and 31 to the next block $V_1(z)$. This delay/rotate procedure is then repeated in subsequent blocks $V_1(z)$ to $V_N(z)$. These later blocks will not be described further because they operate in the same way as the first block $V_0(z)$, except their delays and rotations will usually be different. Implementation of this procedure to find appropriate delays and rotations will be described later, following a theoretical discussion.

A full paraunitary matrix parameterisation in accordance with the invention in terms of elementary paraunitary matrices can be expressed as follows:

$$H_N(z)=V_{d_N,\theta_N}(z) \ldots V_{d_1,\theta_1}(z)V_{d_0,\theta_0}(z) \quad (17)$$

The progress of imposing wide sense decorrelation upon signals in accordance with the invention uses a cost function that is calculated after every application of an elementary paraunitary matrix to the signals to determine whether or not an improvement has been achieved. The cost function is a measure of the signals' strong decorrelation, an example of which is a sum squared of second order measures of autocorrelation of the signals, and is at a maximum when all cross-correlation terms are at a minimum. Thus an increase in this cost function corresponds to a reduction in correlation between the signals. The cost function will be referred to as the Decorrelation Cost Function (hereinafter "DCF").

The process of the invention is to find an appropriate paraunitary matrix that imposes wide sense decorrelation on the signals. This matrix is not parameterised as disclosed by Vaidyanathan, but it is instead parameterised in terms of elementary paraunitary matrices (see Equation (17)) calculated sequentially. Once derived, each elementary paraunitary matrix is applied to the signals used to calculate it: this transforms the signals into a form suitable for calculating the next such matrix.

To calculate an elementary paraunitary matrix a set of possible delays is considered. A latest elementary paraunitary matrix is chosen which maximises the DCF calculated for signals transformed by application of all such matrices calculated up and including the latest. To identify the latest elementary paraunitary matrix its delay and rotation parameters are required. There is a countable infinity of different possible delays, but an uncountable number of different rotation parameters. Realistically the countable infinity of possible delays will be reduced to a finite number of different delays to be considered, either by constraining them or by making the assumption of circulant statistics and hence constraining them to be less than the data length (number of samples of each signal used in decorrelation).

Once a trial value of delay has been applied to the signals, rotation parameters $s_0$ and $c_0$ are chosen. These parameters could be chosen by using a technique which explicitly maximises the DCF of output signals.

It is therefore possible to look at a range of trial delays and for each delay to attach the rotation that maximised the DCF after the application of the delay and the rotation. This produces a set of possible elementary paraunitary matrices, each associated with a respective DCF found by applying it to signals and finding the DCF of the resulting output. Under certain assumptions it may be possible to avoid applying the elementary paraunitary matrices to the signals, and instead to calculate the DCF of the resulting output directly. This has computational advantages, but is only possible in some cases.

The elementary paraunitary matrix that is selected is that having the best DCF output. This stage is repeated until there is no gain in DCF to be found, or the gain in DCF is regarded as being too small to warrant the extra complexity in the strongly decorrelating matrix.

Thus the invention can be seen as a method of imposing wide sense decorrelation by sequentially applying a series of elementary paraunitary matrices each chosen to maximise an DCF measure in an output resulting from its use. Each elementary paraunitary matrix contains one rotation. Thus the process of the invention implements an algorithm referred to as the Sequential Best Rotation (SBR) algorithm. This algorithm comprises decomposition of the paraunitary matrix into elementary paraunitary matrices, and the use of a measure which can be meaningfully calculated at each stage of the algorithm not just at the end. The combination of these two steps separates the algorithm into a series of like stages that can be carried out in sequence.

Strong decorrelation of signals is equivalent to a process of generating a strongly decorrelating matrix H(z). This process will now be described. It is not essential to generate H(z), but it permits the process to be tested: i.e. mixed signals which have undergone a prearranged form of convolutive mixing can be used to produce H(z), and then $\tilde{H}(z)$, the paraconjugate of H(z), can be compared with the prearranged form to see how faithfully the former reconstructs the latter. Moreover, it can be shown that under certain circumstances H(z) can be used to determine further information about original signals, such as arrival direction and frequency response.

Figure 3:
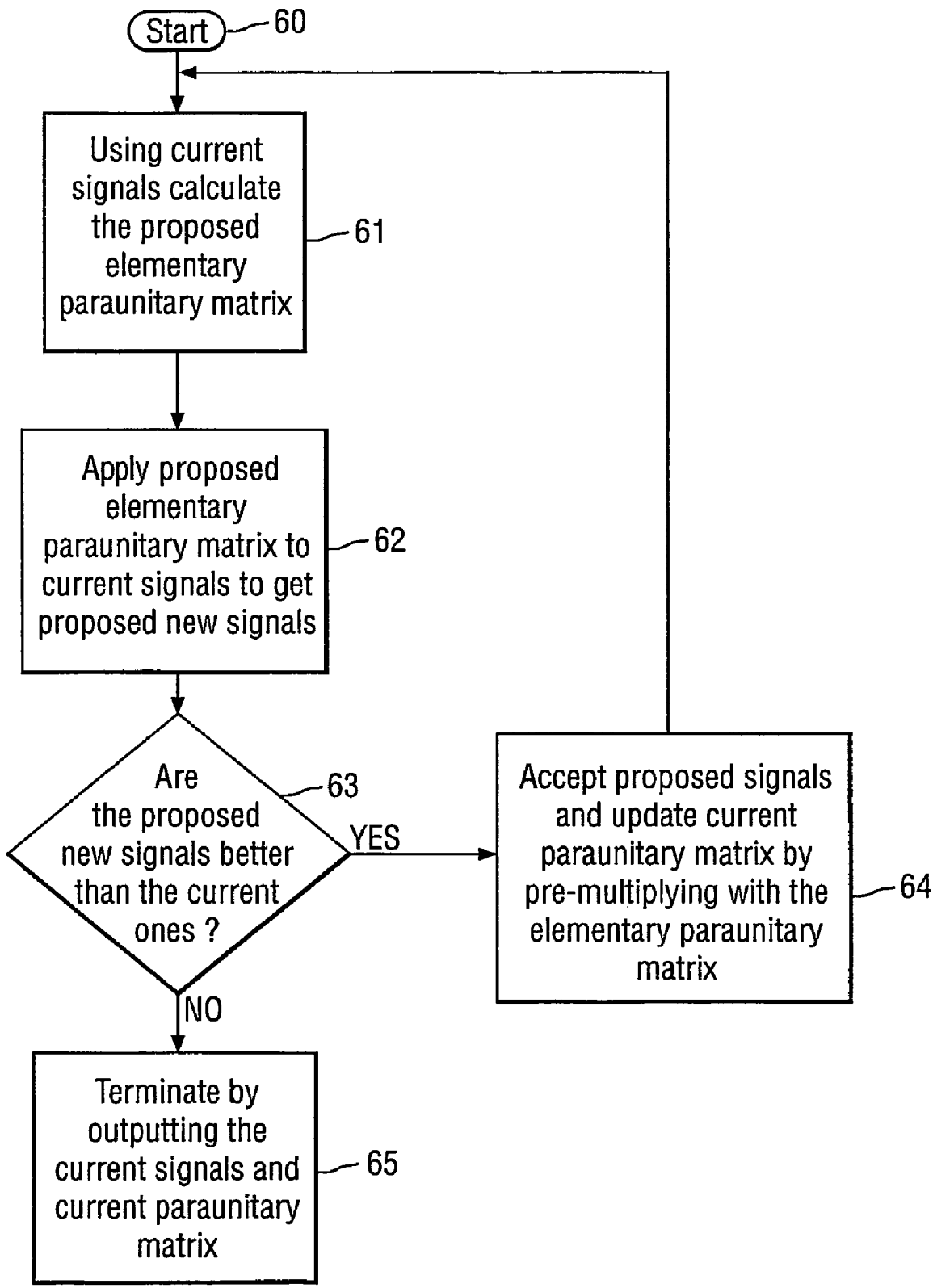
FIG. 3 is a schematic block diagram illustrating production of a paraunitary matrix from elementary paraunitary matrices in a process of the invention.

Referring now to FIG. 3, a flow diagram is shown illustrating an iterative process of the invention to produce a strongly decorrelating polynomial paraunitary matrix H(z) as the product of a series of elementary paraunitary matrices. At the beginning of each successive iteration of the process there is a respective current value h(z) of the evolving paraunitary matrix, i.e. the product of all elementary paraunitary matrices calculated up to the present time. There is also a set of current signals derived using the most recently calculated elementary paraunitary matrix incorporated in h(z): b(z) represents the transformation which converts the original input mixed signals to obtain the current signals: it is improved repeatedly until applying a further elementary paraunitary matrix results in no significant improvement in DCF, at which point h(z) has become H(z).

The process starts at 60, where the initial current signals are the original input signals, and the initial current value of the paraunitary matrix h(z) is the identity matrix I. At 61 the current signals are used to produce a current elementary paraunitary matrix; at 62 this matrix is applied to the current signals to produce new signals. At 63 the new signals are tested to see whether their strong decorrelation properties have improved: if such an improvement has been obtained, at 64 the current elementary paraunitary matrix is used to pre-multiply h(z) to provide the latest current value of the evolving paraunitary matrix and the new signals become the latest current signals. The latest current value of h(z) and the latest current signals are then fed back to stage 61 for the procedure of stages 61, 62 and 63 to be repeated.

If at 63 the new signals show no improvement over the current signals, the process is considered to have converged to a solution and it terminates at 65: the current value of h(z) is output as H(z) and the current signals are output as the required strongly decorrelated signals. Thus the use of elementary paraunitary matrices divides the problem of strongly decorrelating signals and obtaining H(z) into a number of sub-problems.

Methods for finding each elementary paraunitary matrix at 61 and for deciding at 63 whether or not the new signals are improvements over the current signals will now be described. The second relies upon a measure of strong decorrelation of signals being used. An accurate and comprehensive decorrelation cost function (DCF) is impossible to calculate from sampled signals, but it is possible to calculate various different measures of strong decorrelation. Some examples of good decorrelation cost functions will now be given. They are based upon the correlation terms $r(x_1, x_2)$ of a set of signals defined by:

$$r(x_1, x_2) = E[x_1 x_2] \quad (18)$$

where E is the expectation operator and $x_1$ and $x_2$ are signals in the set: they may be different signals, or the same signals, and they may have delays applied to them.

Decorrelation cost functions, denoted by $N_1^L$, are defined as the sum squared of all possible correlation terms in a set of signals. In the present example correlations are derived between each signal in the set and a relatively delayed replica of itself, i.e. there are no correlations between different signals: $x_1$ and $x_2$ in Equation (18) are therefore the same signal with a relative delay therebetween, and correlations are obtained for each of a set of delays up to a maximum delay of L. The maximum delay L can be regarded as an indication of the locality of the cost function. If L=0 the cost function is referred to as a pointwise cost function, if L is small, i.e. L<5, the cost function is referred to as a local cost function, otherwise it is a wide cost function.

Changing the L value changes the properties of $N_1^L$, but for all values of L this is a sensible decorrelation cost function. In particular, the two cases of L=0 and L=max (i.e. the largest value that can be measured using the sampled signals) have been successfully used. The L=0 DCF leads to an algorithm which imposes spectral majorisation, while the L=max DCF leads to an algorithm that only imposes wide sense decorrelation, and not spectral majorisation. The process of the invention may use any convenient DCF, provided it is an accurate DCF and is used consistently throughout: specific problems may suggest specific DCFs.

At 63 current signals and new signals are compared by calculating their DCFs: the signals having the higher DCF are accepted as being the better of the two.

To obtain the latest elementary paraunitary matrix at 61, it is necessary to derive two parameters which characterise such a matrix, a delay parameter d and a rotation parameter θ. Thus identification of the elementary paraunitary matrix reduces to finding (d,θ). The parameter d is a vector parameter, and θ can be a vector parameter if there are more than two signals. However in this example only the case of two signals is being considered, thus θ is not a vector.

To find the delay parameter d, a set D of possible values for it is selected. A suitable set for the two-signal case is shown below in Equation (22), i.e. D may be represented as:

$$D = \left\{ \begin{pmatrix} 0 \\ A \end{pmatrix}, \begin{pmatrix} 0 \\ A-1 \end{pmatrix}, \ldots \begin{pmatrix} 0 \\ 1 \end{pmatrix}, \begin{pmatrix} 0 \\ 0 \end{pmatrix}, \begin{pmatrix} 1 \\ 0 \end{pmatrix}, \ldots \begin{pmatrix} A-1 \\ 0 \end{pmatrix}, \begin{pmatrix} A \\ 0 \end{pmatrix} \right\} \quad (19)$$

where dots indicate terms not shown, each inner pair of parentheses represents a delay vector $\delta_i$ having two elements, 0 in an upper or lower position in parentheses indicates an undelayed upper or lower signal channel respectively, and a non-zero value in such a position indicates a delayed channel located likewise: each non-zero value represents delaying the associated channel in each case relative to the other channel by an integer value not greater than A. Delays are in units of a time interval τ between successive signal samples, e.g. a delay (A−1) implies (A−1)τ. There are also other possibilities for D, but before major departures from this scheme are implemented they should be assessed for validity. The number of elements or delay values in D is S, i.e. |D|=S.

Figure 4:
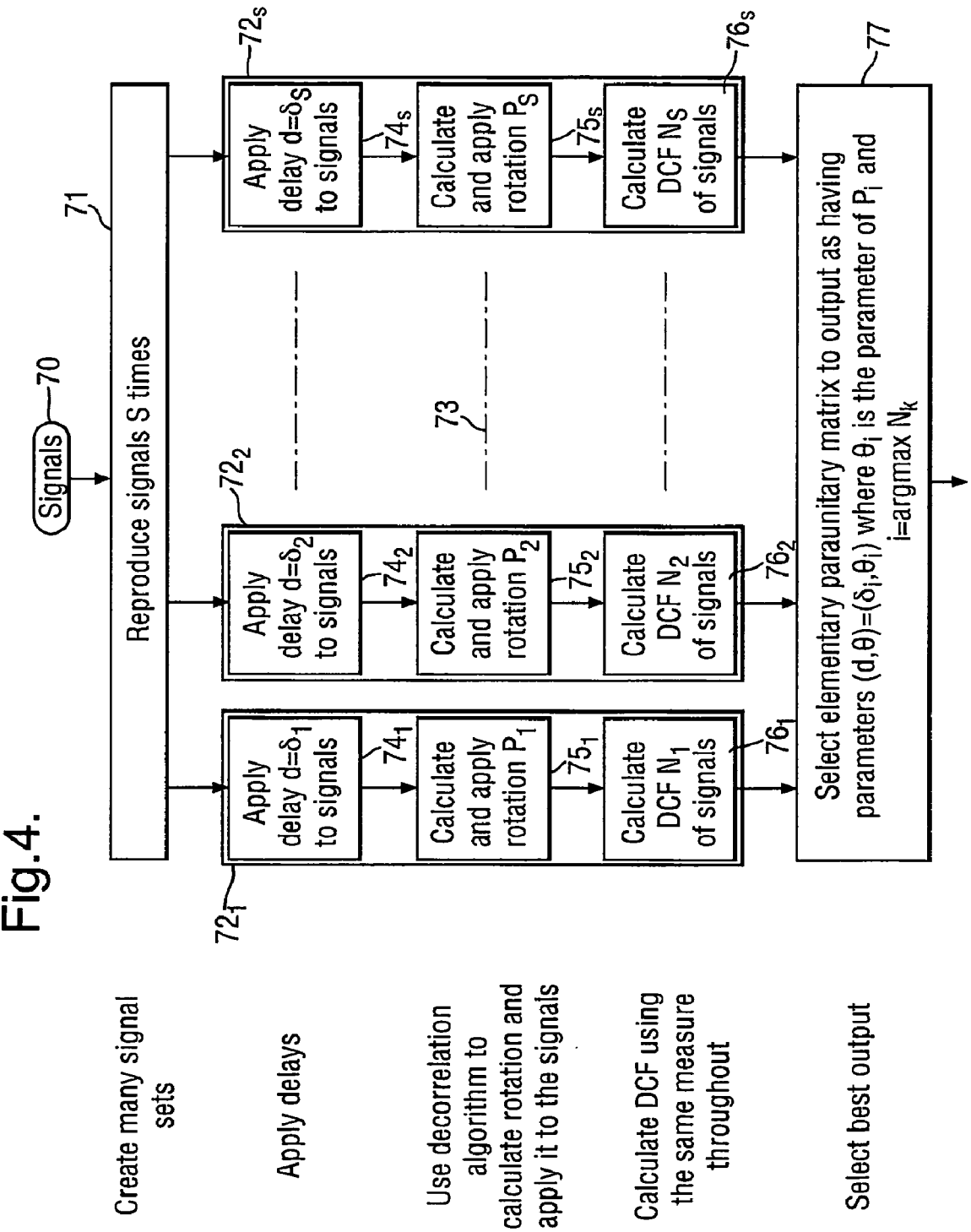
FIG. 4 illustrates production of elementary paraunitary matrices in a process of the invention.

Referring now to FIG. 4, there is shown a flow diagram indicating how elementary paraunitary matrices can be found. For all delay vectors $\delta_1$ to $\delta_S$ in D, respective elementary paraunitary matrices are derived, and then the DCFs of the signals these matrices create are calculated. The elementary paraunitary matrix corresponding to the best DCF is then selected for use. In the drawing, in the two-channel case a pair of current signals are input at 70. At 71 the signals are replicated S times, i.e. as many times as there are delay values in D. In the two channel case each replica is a pair of current signals: each replica pair is input to a respective signal channel $72_i$ of which there are S, i.e. i=1 to S. Three channels are shown, $72_1$, $72_2$ and $72_S$, others being implied by chain lines such as 73. At $74_1$ to $74_S$, each of the channels $72_1$ to $72_S$ applies a respective delay vector $\delta_1, \ldots \delta_S$ from D to its replica, i.e. it delays one of the pair of current signals in its replica relative to the other: the ith channel $72_i$ applies delay vector $\delta_i$ to the ith replica, and i=1 to S. In each of the channels $72_1$ to $72_S$ the relative delay produces a pair of signals that are different from those input at 70, although they are no more strongly decorrelated than before.

To make these signals as decorrelated as possible in a pointwise sense using only a rotation can be achieved by using an instantaneous algorithm. A review of many methods of imposing instantaneous decorrelation, both with and without using energy preserving techniques, appears in "Matrix Computations", John Hopkins University Press 1989 by G. H. Golub and C. F. Van Loan. This covers a wide range of techniques developed over the last 150 years, and discusses numerical issues caused by the introduction of computers into the field.

Suitable rotations may be calculated by one of several different techniques. For many choices of DCF it may be possible to calculate the rotation that explicitly maximises the DFC of the signals after the application of the rotation. It may also be possible to try to find this rotation by a numerical approximation method. A third possibility is to use a pointwise decorrelation algorithm to find the rotation that imposes pointwise decorrelation; this should lead to an improvement in DCF to at least a predominant part of the maximum improvement attainable in this regard. These three rotation finding possibilities may coincide, as they do for the $N_1^L$ measure with L=0.

Each channel $72_i$ now has parameters associated with it consisting of a delay vector $\delta_i$ and a rotation angle $\theta_i$, just as if an elementary paraunitary matrix implementing those parameters had been applied to the signals input at 70: moreover, when applied to input signals this matrix provides a rotation which produces output signals that are as decorrelated as they can be for the relevant value of delay element $\delta_i$. The first two elements $74_i$ and $75_i$ of each channel $72_i$ therefore in combination simulate an elementary paraunitary matrix with a single set of delays and a respective parameter set $(d,\theta)=(\delta_i,\theta_i)$.

The next stage is to determine which of the channels $72_1$ to $72_S$ simulates an elementary paraunitary matrix producing the highest improvement in strong decorrelation. This is carried out at $76_1$ to $76_S$, where DCFs of signals output from stages $75_1$ to $75_S$ respectively are calculated. These DCFs are compared with one another at 77, and whichever channel produces the greatest DCF provides the highest improvement in strong decorrelation and simulates the best elementary paraunitary matrix: this matrix is selected as the output of the process indicated in FIG. 4 for use at 61 in FIG. 3.

On making certain assumptions regarding the input signals it is possible to avoid most of the calculations in this stage. It may be possible to predict the DCFs of signal outputs from stages $75_1$ to $75_S$. If this is possible then it is not necessary to carry out the calculations for any of the channels except the one that will lead to the greatest increase in DCF. In general if this approach is valid, it is worth doing as the computational savings will be considerable. An example of this technique is now given. If the cost function is $N_1^L$ with L=0 then the maximum possible gain in DCF achievable for a given delay is simply the correlation between the two signals after that delay has been applied. By using the circulant assumption, this correlation can be calculated for all possible delays by using Fourier transforms. This is a prior art technique for calculating the cross correlation between two signals, and is computationally inexpensive compared with calculating the cross correlations for each delay individually. Thus the delay which leads to the maximum cross correlation between the two signals can be selected, without having to apply delays and calculate rotations for each of the channels.

It is not in fact essential to choose whichever channel produces the greatest DCF: another channel giving a value relatively close to this value would be acceptable. Also a channel might be selected to give a more convenient value for one of the parameters, e.g. a shorter delay. If however a channel is chosen giving a value insufficiently close to the greatest DCF, then the process of signal separation may fail because it might be impossible to rectify matters in subsequent iterations. So a channel should be selected which gives a DCF or improvement in decorrelation to at least a predominant part of the maximum in this regard obtainable over the ranges of delay and rotation parameters employed.

The foregoing embodiment of the invention related to imposing wide sense decorrelation in a two-channel case, i.e. two signal sources, two receivers and two paths from each source to receivers. If there are more than two channels further processing is necessary. However the procedure of the invention remains fundamentally the same: i.e. find a paraunitary matrix to impose strong decorrelation on signals in the channels, the matrix being a product of successive elementary paraunitary matrices each of which maximises a measure of strong decorrelation of outputs resulting from its application to input signals.

There are several ways of extending the invention to more than two channels. One is a simple, direct extension of the previous embodiment. Others use signal pairs, attempt to impose pairwise independence, and sweep through all signal pairs in some order.

Figure 5:
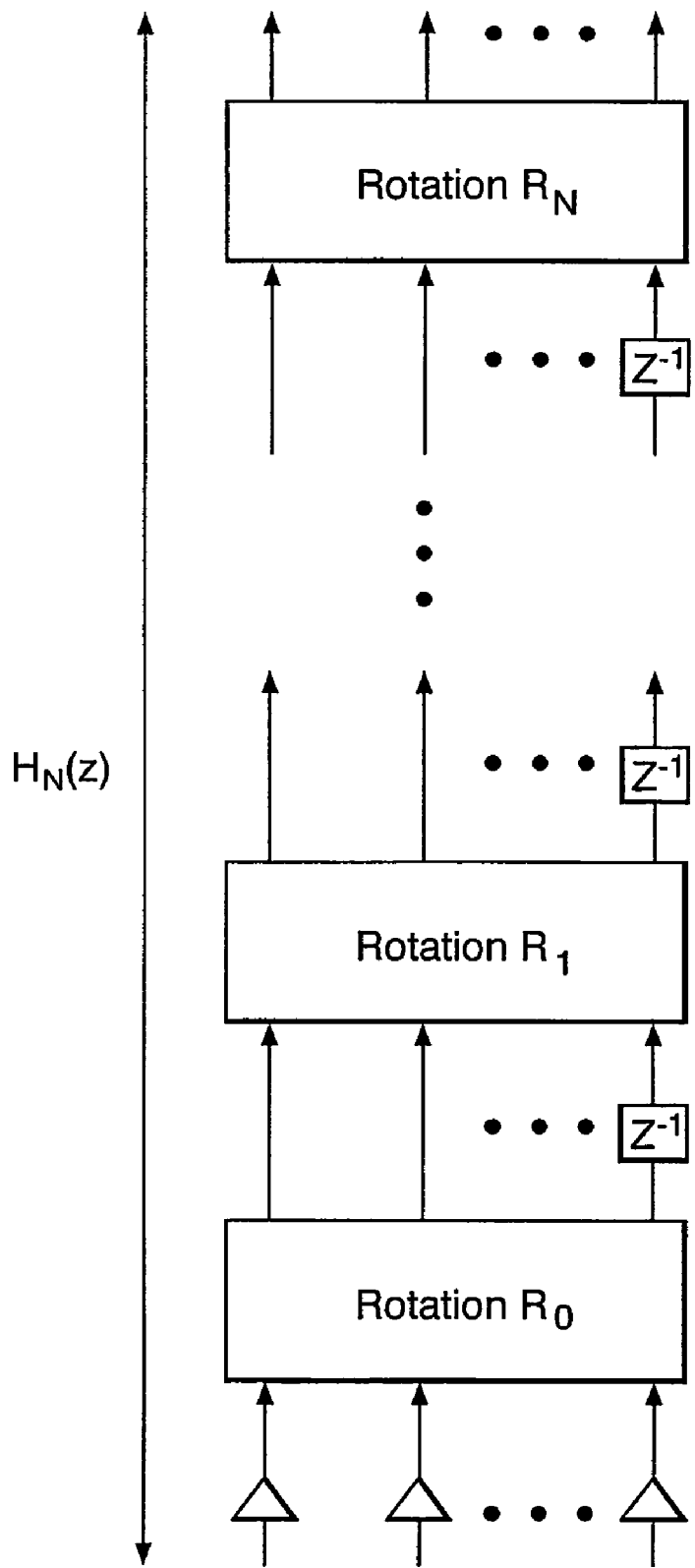
FIG. 5 illustrates decomposition of a paraunitary matrix into elementary paraunitary matrices in a prior art wide sense decorrelation process involving more than two signal channels.

FIG. 5 shows the decomposition of a paraunitary matrix with degree N for the multi-channel case (i.e. three or more channels) as given by the Vaidyanathan prior art previously mentioned. It is very similar to the two-channel case of FIG. 1. The difference is that Givens rotations, which are essentially two-channel operators, have been replaced with more general rotations operating on all channels at once. This can be expressed mathematically as:

$$H_N(z)=R_N \ldots \Lambda(z)R_1\Lambda(z)R_0 \quad (20)$$

where as before $\Lambda(z)$ is a matrix representing successive unit delays in the lowermost channel, and $R_i$ (i=0 to N) represents the ith rotation. In the n channel case each rotation has $n(n-1)/2$ parameters, which reduces to one parameter when n=2 for Givens rotations used in the two-channel case.

The parameterisation of Equation (20) involves the same problems as in the two-channel case described with reference to FIG. 1. Here again the procedure used to deal with the problems is the decomposition of a paraunitary matrix into elementary paraunitary matrices: the elementary paraunitary matrices are found by considering the decomposition and constraining all but one rotation. One rotation is unconstrained, but all others are constrained to either leave inputs unchanged or to reorder channels so a different channel receives a subsequent delay. Thus all rotations apart from one are constrained to be permutations. In the present example of an elementary paraunitary matrix with only one set of delays, the unconstrained rotation is the last rotation, and the matrix can thus be expressed as:

$$V_{d,\theta}(z)=R_\theta\Lambda(z) \ldots P_1\Lambda(z)P_0=R_\theta D_d(z) \quad (21)$$

Here $P_i$ is the ith permutation matrix and $R_\theta$ is the rotation matrix parameterised by a vector of $n(n-1)/2$ rotation angles $\theta$. The combination of all permutation matrices and delay matrices is denoted by $D_d$, which is referred to as the delay matrix. Its index, d, is a length n vector whose n elements are delays applied in respective channels.

Equation (21) shows the extended form of an elementary paraunitary matrix. First a delay matrix is applied, which consists of differing delays being applied in all the channels. Secondly a rotation is applied. As before this is a good choice for an elementary building block, as it contains only one operation that mixes the signals. However, this form is parameterisable, the parameters being the vectors d and $\theta$. This means that the decomposition of a paraunitary matrix into elementary paraunitary matrices can be written as:

$$H(z)=V_{d_N,\theta_N}(z) \ldots V_{d_1,\theta_1}(z)V_{d_0,\theta_0}(z) \quad (22)$$

The methodology for finding this expansion is largely the same as in the two-channel case. It only requires modification in selecting D, i.e. the delay set or set of possible delays for forming the first of the series of elementary paraunitary matrices. In the two-channel case the elements of D were treated as delays applied to only one channel. In the more general case delays are allowed in more than one channel. As in the two-channel case there is a countable infinity of possibilities, so a sensible finite set has to be selected to form D.

The number of elements in D could be fixed by setting an upper limit denoted by l to the number of delays in it. Thus D can consist of all possible ways of allocating up to l delays between n channels. Applying the same delay to all channels at the same time is equivalent to applying no delay at all, so all elements in D should have at least one channel that is not delayed. The number of elements in D can grow very fast as n and l increase. As before this scheme for D is merely selection of a sensible option. Other possibilities exist but usually need more justification to ensure validity. It is possible to justify some choices (such as allowing delays to be applied to only one channel) by saying they allow a higher l for a fixed size of D. Thus they allow the algorithm to consider longer delays, at the cost of not allowing it to implement more complicated combinations of smaller delays.

However it is defined, once D is fixed the process of the invention can proceed to impose wide sense decorrelation in the multi-channel case in a similar way to the two-channel case of the previous embodiment. There are two differences: firstly, the two-element delay vectors $\delta_i$ in FIG. 4 are replaced by delay vectors (elements of the delay set D) having n elements, where n is the number of channels. This allows the algorithm to apply an element of D to the signals. Secondly, the rotations calculated by known pointwise decorrelation algorithms at stages $75_1$ to $75_S$ are now n channel rotations. These can be obtained by successively applying n(n−1)/2 two channel rotations, and so can be parameterised by n(n−1)/2 angle parameters: Prior art pointwise decorrelation algorithms previously mentioned provide current signals and a rotation matrix which generates them, so the process will not be described further.

This approach to the multi-channel case may give difficulty over the size of the delay set D: because each element in D is a vector, for each element a whole n by n pointwise decorrelation algorithm has to be carried out. As the delay set upper limit l grows this becomes the dominant time constraint and slows processing down. So-called "sweeping" algorithms were developed in the prior art to attempt to mitigate similar problems in the instantaneous case.

The principle of using energy preserving transforms to zero the correlation between a set of signals has a long history. The first reference is "Uber ein Leichtes Verfahren Die in der Theorie der Sacularstroungen Vorkommendern Gleichungen Numerisch Aufzulosen" Crelle's J. 30 p 51-94, 1846 by C. G. J. Jacobi. He introduced the idea of tackling the multichannel case by sweeping through pairs of signals in such a way as to strictly decrease the total measure of correlation between different signals in the problem at each stage. This technique is known as using Jacobi sweeps It has been shown that cycling through different signal pairings and imposing pairwise decorrelation leads to good decorrelation of several signals, provided that there are repeated sweeps through all available signal pairs. The technique for decorrelating several signals by repeated sweeps through all available signal pairs imposing pairwise decorrelation on each pair is known as the Jacobi algorithm. At any one stage it only works on making two signals pairwise decorrelated.

This example of the invention provides a procedure called the sweeping process for finding an elementary paraunitary matrix based algorithm that follows the same approach used in the Jacobi algorithm. The procedure has a prearranged ordering of all available signal pairings through which it works in a sweep. Each signal pair is processed using the two-channel process of the first embodiment of the invention. The remaining signals are aligned in time (delayed) so they have at least approximately the same delay applied to them as the signal pair being processed. At the end of a sweep the same termination condition from the previous embodiment of the invention can be applied to decide if another sweep needs to be carried out or if no more significant improvement is obtainable.

Figure 6:
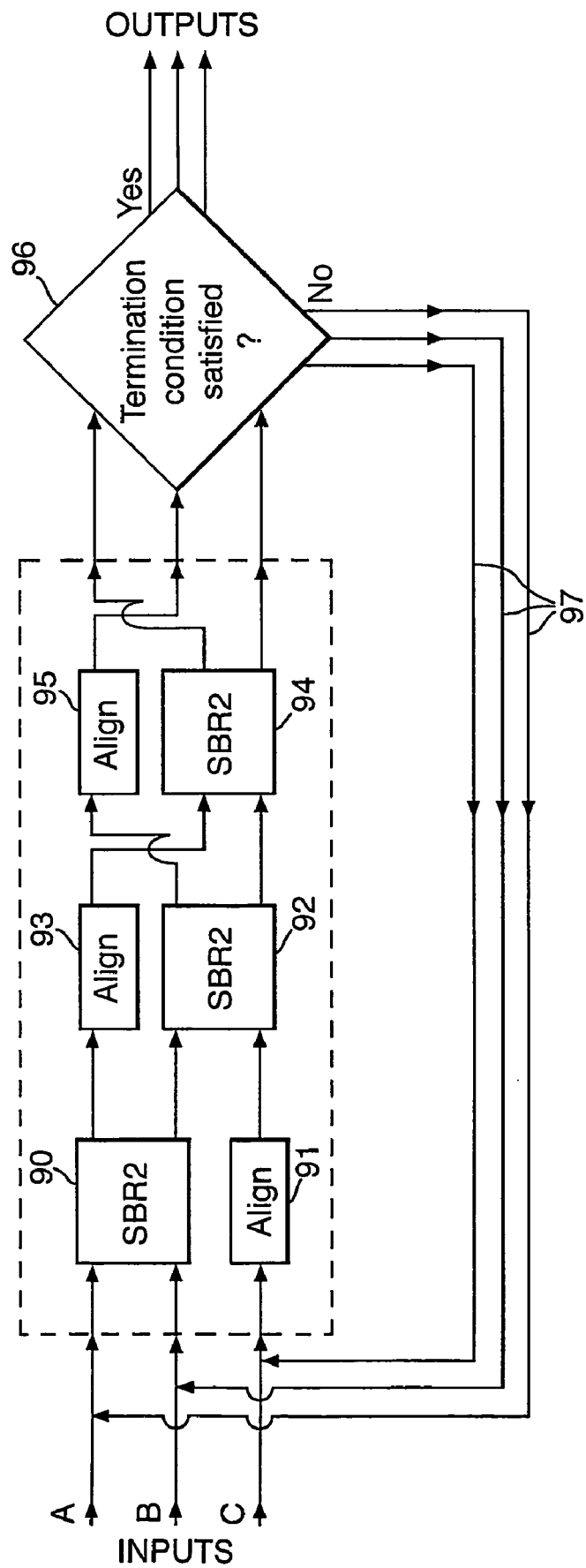
FIGS. 6 and 7 schematically illustrate alternative wide sense decorrelation processes of the invention involving more than two signal channels.

FIG. 6 illustrates this procedure for imposing wide sense decorrelation on three signals A, B and C. As mentioned earlier the process of the invention implements the Sequential Best Rotation or SBR algorithm. In the drawing, "SBR2" indicates application of the SBR algorithm for a two-channel case as in the previous embodiment.

In an initial phase, signals A and B are processed with SBR2 at 90, and at 91 signal C is aligned in time for substantial synchronisation with the output from 90. In this example the elementary paraunitary matrices implement only one set of delays, and time alignment at 91 is carried out by delaying C by half the order of the polynomial matrix determined at 90. In other words C is delayed in time by half the sum total of the delays applied in the processing of A and B irrespective of which channel the or (as the case may be) each delay lies in. Alignment of C in this way is not essential but has been found to give acceptable results. It is not necessary to allow for processing delay to implement SBR2 at 90, because the signals A, B and C are sequences of digital data samples stored when not in use: "delaying" C relative to A or B merely means changing the sample number in a sequence input to a subsequent processing stage.

At stages 90 and 91 in combination, at least one elementary paraunitary matrix is applied to all three signals: such a matrix can be generated by extending the or as the case may be each two channel elementary paraunitary matrix produced at 90 to cover three channels. The or each matrix applies rotation and delay to signals A and B but it applies a delay to signal C without rotating it. If more than one elementary paraunitary matrix is determined at 90, all delays applied to signal C must add up to the total delay applied to C at 91.

In a second phase, signal B (after processing at 90) and signal C (after delay at 91) are processed with SBR2 at 92, and signal A (after processing at 90) is aligned in time at 93 with the output from 92. In a third phase, signal A (after alignment at 93) and signal C (after processing at 92) are processed with SBR2 at 94, and signal B (after processing at 92) is aligned in time at 95 with the output from 94.

The next stage at 96 is to determine whether or not the signals have become sufficiently strongly decorrelated to warrant terminating the process, or whether it is necessary to continue: as before this termination condition is satisfied if DCFs of the signals have not improved significantly: if so, processing terminates; if not a respective elementary paraunitary matrix determined at each of 90, 92 and 94 is used to pre-multiply a stored product of those preceding it and the latest resulting product replaces that previously stored; the latest current signals from SBR2 94 and alignment 95 are then fed back to 90 and 91 via a feedback loop 97 for the procedure to be repeated.

In this embodiment, one or more two-channel elementary paraunitary matrices may be applied in the SBR2 stages at 90, 92 and 94 for each circulation round the loop of items 90 to 97. It is possible to apply as many elementary paraunitary matrices at these stages as one wishes, up to the number necessary to meet the termination condition for the SBR2 algorithm. It is preferred to apply only one elementary paraunitary matrix at the stages 90, 92 and 94 because it reduces the need for signal alignment at 91, 93 and 95: it uses the philosophy of applying the more important rotations first, because earlier rotations in the SBR2 process tend to give more performance gain than later equivalents.

Figure 7:
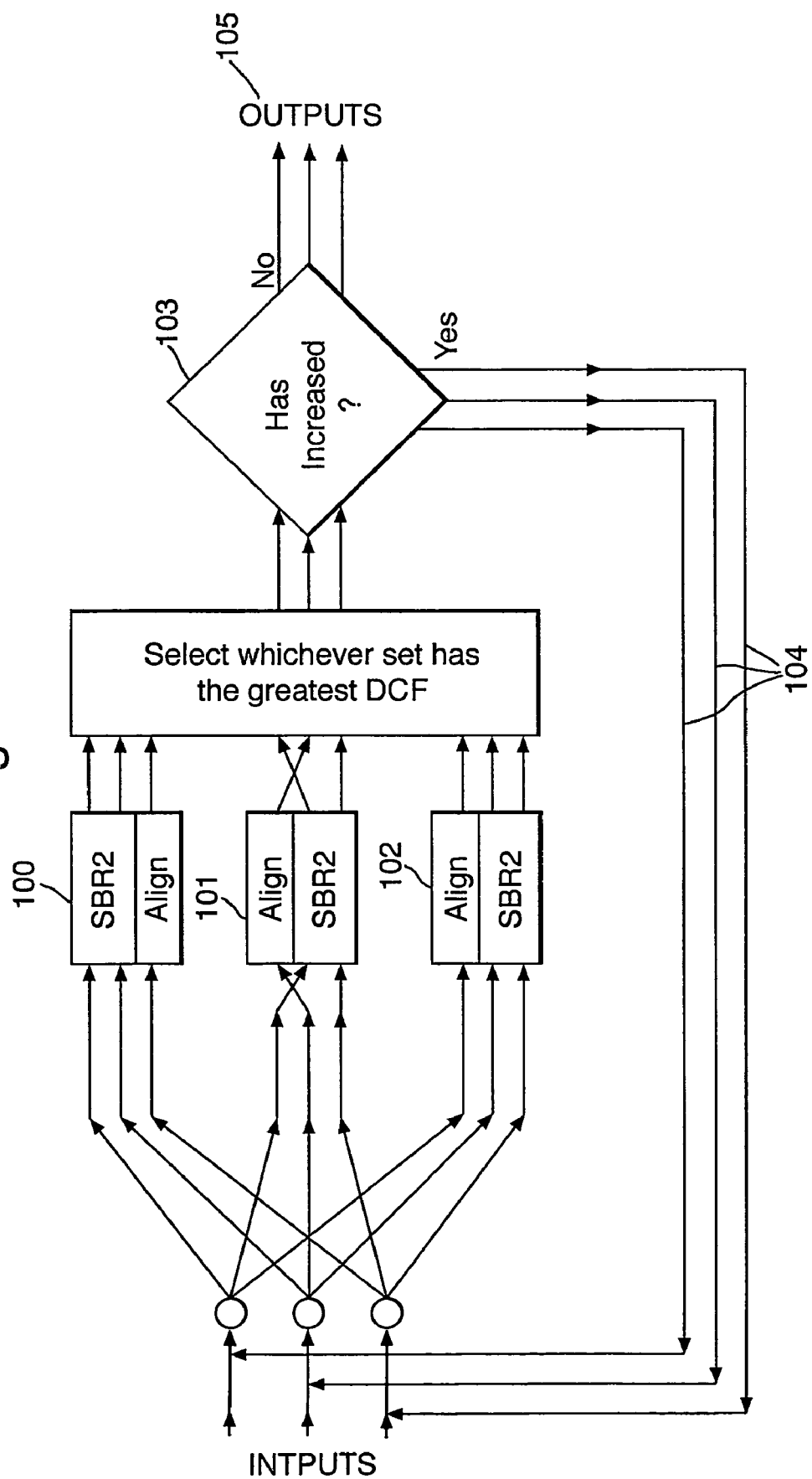

If, rather than operating on signal pairs in a fixed order, the pair that leads to the greatest DCF increase is operated on first, another approach for imposing wide sense decorrelation can be produced. This approach also operates on pairs, but pair ordering is not fixed. Instead all possible pairs are considered and the one that leads to the greatest improvement in DCF is accepted. This is known as a searching process, as it searches through possible signal pairs. FIG. 7 illustrates the procedure for three signals A, B and C. The signals are replicated $n(n-1)/2$ times where n is the number of signals: $n=3$ in the present example, which coincidentally means there are three replicas of the signals. In an initial phase, using a first replica of the three signals A, B and C, at 100 signals A and B are processed with SBR2, and, in this example using elementary paraunitary matrices with one set of delays, signal C is aligned in time with the output so produced. Here again a (or as the case may be each) two channel elementary paraunitary matrix produced by the application of SBR2 to two signal channels is extended to an n channel elementary paraunitary matrix that delays (but does not rotate) the or each remaining signal C to preserve time alignment with SBR2-processed signals A and B.

For a second replica, at 101 signals A and C are processed with SBR2, and signal B is aligned with the output. For a third replica, at 102 signals B and C are processed with SBR2 at 94, and signal A is aligned with the output. At 103, the DCFs of the three output signal groups are determined: the group with the greatest DCF is selected, and if the DCF shows an improvement over the input signals to this stage, then the operation is accepted.

As before, if the DCF of all the signals has been improved, processing continues with new current signals and new current matrix being fed back via a loop 104 to 100, 101 and 102. If there has been no significant improvement, processing terminates and at 105 the current signals and paraunitary matrix are output.

Again the SBR2 steps 100, 101 and 102 may consist of applying a full SBR2 process of calculating a series of elementary paraunitary matrices until no improvement is obtained, or just finding one elementary paraunitary matrix. The latter case is equivalent to a restricted version of a full SBR: i.e. ignoring time alignment, the delays are restricted to only delaying one channel and the rotations to only applying a rotation to the delayed channel and one other. This reduces the size of the delay set and hence increases the speed of computation of elementary paraunitary matrices.

Although the elementary paraunitary matrices described with reference to FIG. 2 are sufficient for implementing the invention, practical applications of the invention may work better if an extended definition of elementary paraunitary matrices is used. A more general definition of an elementary paraunitary matrix is a polynomial matrix which represents applying an initial set of delays to input signals, then applying a single unitary transformation (rotation) to the delayed input signals, followed by applying a further set of delays to the delayed and rotated input signals. The initial set of delays is defined as the leading delays and the further set of delays as the terminal delays.

Figure 8:
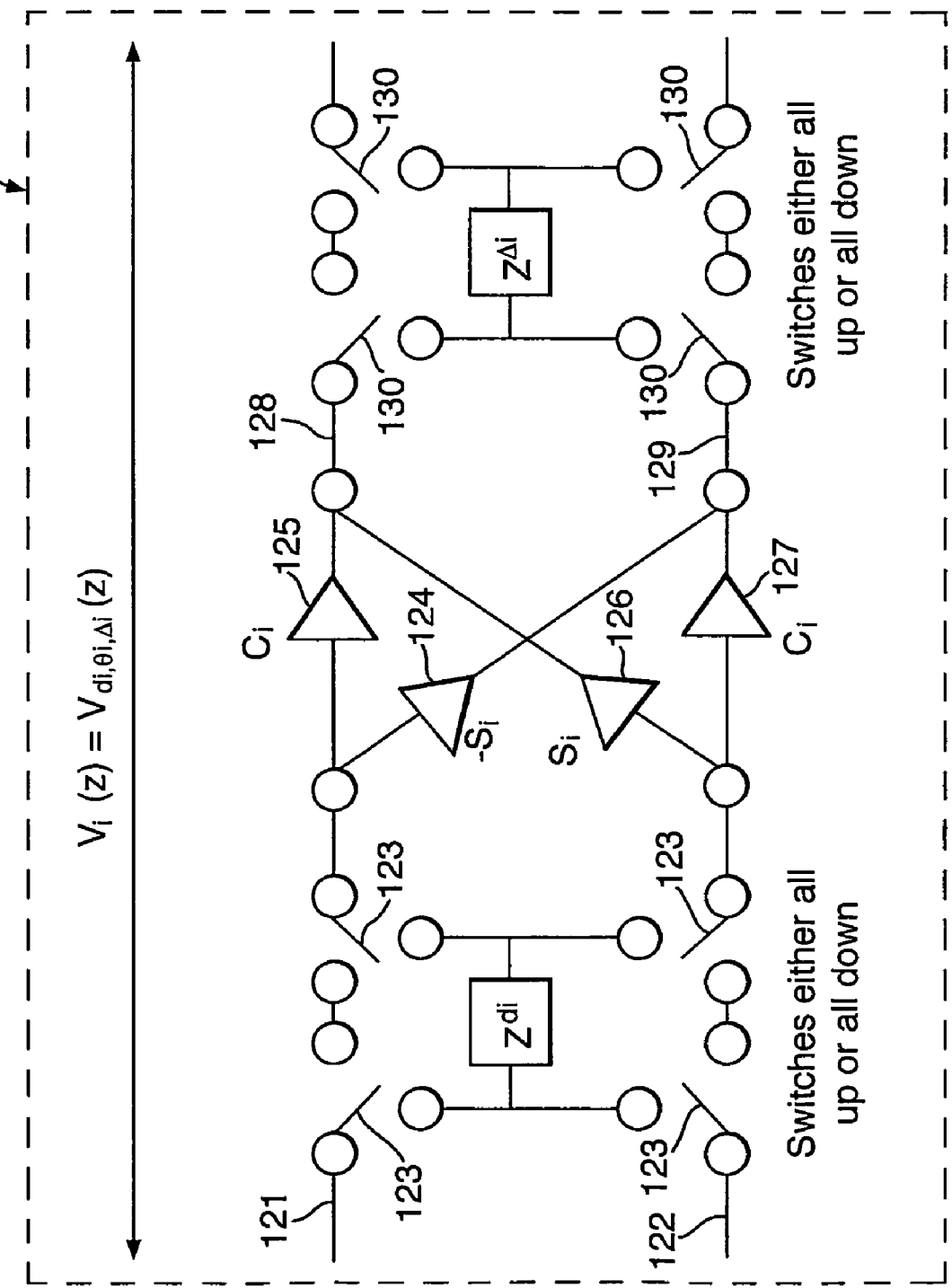
FIG. 8 illustrates implementation of an alternative form of elementary paraunitary matrix involving a leading delay, a rotation and a terminal delay.

FIG. 8 illustrates a single elementary paraunitary matrix implementation 120 of this new form: as in FIGS. 2 and 3 this implementation is shown for a two channel case for the sake of simplicity. In the implementation 120, signals in upper and lower channels 121 and 122 pass into a matrix of four ganged single pole double throw switches 123 controlling routing or otherwise via a delay cell $Z^{di}$. The switches 123 are all either in the UP position or in the DOWN position: when DOWN, upper channel signals are delayed at $Z^{di}$ but lower channel signals are not, and when UP the reverse is the case. This enables either channel 121 or 122 to be delayed relative to the other.

On leaving the switches 123, an upper channel signal is multiplied by Givens rotation parameters $-s_i$ and $c_i$ at amplifiers 124 and 125 respectively. Similarly, on leaving the switches 123, a lower channel signal is multiplied by Givens rotation parameters $s_i$ and $c_i$ at amplifiers 126 and 127 respectively. Here $s_i$ and $c_i$ are respectively the sine and cosine of a rotation angle $\theta_i$ implemented at 120. Each $c_i$ product is summed with the $s_i$ or $-s_i$ product involving the signal from the other channel: this provides sums which pass along respective channels 128 and 129 to another matrix of four ganged single pole double throw switches 130 controlling routing or otherwise via a delay cell $Z^{\Delta i}$. These operate in a similar way to the switches 123.

A paraunitary matrix can be constructed by replacing each of the dotted line blocks $V_0(z)$ to $V_N(z)$ in FIG. 2 by a respective implementation 120 of the new elementary paraunitary matrix: each of these blocks 120 or $V_i(z)$ (i=0, 1, to N) represents a respective single elementary paraunitary matrix that implements a respective leading delay $d_i$, Givens rotation through an angle $\theta_i$ and terminal delay $\Delta_i$.

A full paraunitary matrix parameterisation in accordance with the invention in terms of the new elementary paraunitary matrices can be expressed as follows:

$$H_N(z)=V_{d_N,\theta_N,\Delta_N}(z) \ldots V_{d_1,\theta_1,\Delta_1}(z)V_{d_0,\theta_0,\Delta_0}(z) \quad (23)$$

Although the full specification of an elementary paraunitary matrix include an arbitary terminal set of delays parameterised by $\Delta_i$, the invention works best if one of two specific types of elementary paraunitary matrix are used. Type 1 elementary paraunitary matrices, which were described with reference to FIG. 2, have no (or zero) terminal delays, i.e. $\Delta_i=0$. Type 2 elementary paraunitary matrices have terminal delays which apply an inverse of respective leading delays, i.e. $\Delta_i=-d_i$. It will be recalled that a negative delay in one channel is implemented by a positive delay in the or each (as the case may be) other channel.

The process of the invention using the new or type 2 elementary paraunitary matrices, to find an appropriate paraunitary matrix that imposes wide sense decorrelation on the signals is very similar to that previously described. The appropriate paraunitary matrix is not parameterised as disclosed by Vaidyanathan, but it is instead parameterised in terms of elementary paraunitary matrices (see Equation (23)) calculated sequentially. Once derived, each elementary paraunitary matrix is applied to the signals used to calculate it: this transforms the signals into a form suitable for calculating the next such matrix.

A delay pair is defined as a pair of delays, one the leading delay and the other the terminal delay, used in an elementary paraunitary matrix. To calculate an elementary paraunitary matrix a set of possible delay pairs is considered. A latest elementary paraunitary matrix is chosen which maximises the DCF calculated for signals transformed by application of all such matrices calculated up and including the latest. To identify the latest elementary paraunitary matrix its delay and rotation parameters are required. There is a countable infinity of different possible delays, but an uncountable number of different rotation parameters. Realistically the countable infinity of possible delays will be reduced to a finite number of different delays to be considered, either by constraining them or by making the assumption of circulant statistics and hence constraining them to be less than the data length (number of samples of each signal used in decorrelation). If type 1 or type 2 elementary paraunitary matrices (as defined above) are to be used the terminal delays are fixed by the value of the leading delays.

Once a trial value of leading delay has been applied to the signals, rotation parameters $s_i$ and $c_i$ are chosen. These parameters could be chosen by using a technique which explicitly maximises the DCF of output signals.

It is therefore possible to look at a set of trial delay pairs and for each delay pair to attach the rotation that maximised the DCF after the application of the leading delay, the rotation and the terminal delay. This produces a set of possible elementary paraunitary matrices, each associated with a respective DCF found by applying it to signals and finding the DCF of the resulting output. Under certain assumptions it may be possible to avoid applying the elementary paraunitary matrices to the signals, and instead to calculate the DCF of the resulting output directly. This has computational advantages, but is only possible in some cases.

The elementary paraunitary matrix that is selected is that having the best DCF output. This stage is repeated until there is no gain in DCF to be found, or the gain in DCF is regarded as being too small to warrant the extra complexity in the strongly decorrelating matrix.

The iterative process for calculating a strongly decorrelating paraunitary matrix H(z) as shown in FIG. 3 remains nearly the same for the new or type 2 elementary paraunitary matrices. The only difference is that to obtain the latest elementary paraunitary matrix at 61, it is necessary to derive parameters which characterise such a matrix, delay parameters d and $\Delta$ and a rotation parameter $\theta$. Thus identification of the elementary paraunitary matrix reduces to finding $(d,\theta,\Delta)$. The parameters d and $\Delta$ are vector parameters, and $\theta$ can be a vector parameter if there are more than two signals. In the case of type 2 elementary paraunitary matrices, $\Delta$ is entirely dependent upon d, and so once d has been found (as described earlier) $\Delta$ has also been found.

Figure 9:
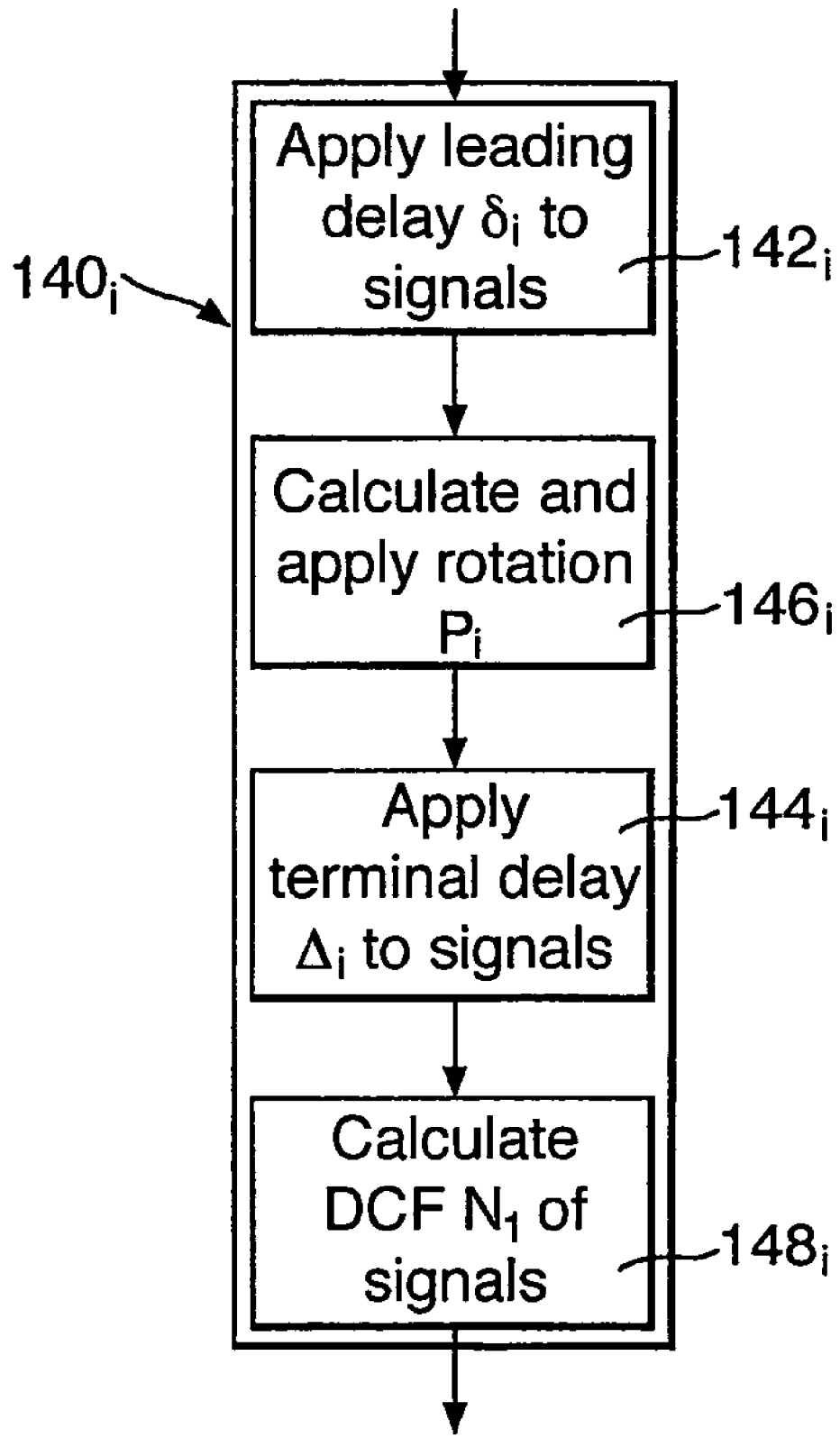
FIG. 9 illustrates use of the FIG. 8 elementary paraunitary matrix in an equivalent of the FIG. 4 process.

The additional parameter $\Delta$ results in a small change as compared to the process described with reference to FIG. 4. This change is illustrated in FIG. 9, which shows a processing channel $140_i$ (i=1 to S) to replace channel $72_i$ in FIG. 4. Ignoring the fact the delay at $74_i$ has been called the leading delay at $142_i$, the only difference between the channels $72_i$ and $142_i$ is that the latter includes provision for application of a terminal delay $\Delta_i$ at $144_i$ after rotation at $146_i$ and before DCF calculation at $148_i$.

The equations and procedures given in the foregoing description can clearly be implemented by an appropriate computer program comprising program instructions on an appropriate carrier medium and running on a conventional computer system. The carrier medium may be a memory, a floppy or compact or optical disc or other hardware recordal medium, or an electrical signal. Such a program is straightforward for a skilled programmer to implement from the foregoing description without requiring invention, because it involves well known computational procedures

The invention claimed is:

1. A computer-implemented method of strong decorrelation of input signals, the method including the steps of:
    a) deriving input signals by means of a receiver system with sensor means;
    b) processing the input signals to determine delay and rotation parameters which implement at least one elementary paraunitary matrix and transform the input signals into output signals to obtain improvement in a measure of strong decorrelation;
    c) assessing the improvement in the measure of strong decorrelation;
    d) if the improvement is significant designating the output signals as input signals and iterating steps b) and c), and if the improvement is not significant designating the output signals as signals decorrelated in a wide sense; and
    e) using the signals decorrelated in a wide sense as one of separated signals and pre-processed signals for input to another process.

2. A method according to claim 1 wherein the delay and rotation parameters which transform the input signals characterise a single elementary paraunitary matrix.

3. A method according to claim 2 including producing a paraunitary matrix by cumulatively multiplying successive elementary paraunitary matrices produced by iterating step a).

4. A method according to claim 2 wherein the range of signal delay parameters is a set of discrete delay vectors, and the delay and rotation parameters are determined by generating a respective version of the input signals delayed by each delay vector in the set, and for each version finding rotation parameters which at least approach producing maximisation of output signals' strong decorrelation.

5. A method according to claim 4 wherein the rotation parameters which at least approach producing maximisation of output signals' strong decorrelation are determined using an algorithm for pointwise decorrelation of the kind used in instantaneous decorrelation.

6. A method according to claim 1 involving n input signals where n is an integer greater than 2, wherein the range of signal delay parameters is a set of n-element delay vectors and the range of signal rotation parameters is a set of n(n−1)/2 angle parameters.

7. A method according to claim 1 involving n input signals where n is an integer greater than 2, wherein step a) comprises determining delay and rotation parameters which implement at least one elementary paraunitary matrix providing for rotation of a pair of input signals and relative delay of the or as the case may be each other input signal.

8. A method according to claim 7 wherein the n input signals are associated with respective channels wherein step a) has n(n−1)/2 successive stages each associated with at least one respective elementary paraunitary matrix and each providing for rotation of signals associated with a respective pair of channels and provision of relative delay associated with the or as the case may be each other channel, the first stage is arranged to process the input signals and the or as the case may be each subsequent stage is arranged to receive signals processed in the respective preceding stage.

9. A method according to claim 1 involving a set of n input signals where n is an integer greater than 2, the method having the steps of:
    a) producing n(n−1)/2 replicas of the set of input signals, b) in each replica selecting a respective signal pair differing to that selected in other replicas, and
c) the step of processing the input signals to determine delay and rotation parameters being carried out for each replica and comprising:
   i) determining delay and rotation parameters which implement at least one elementary paraunitary matrix providing for rotation of the respective selected signal pair only, and
   ii) determining which replica when transformed by the associated at least one elementary paraunitary matrix gives rise to transformed signals corresponding to improvement in a measure of decorrelation by at least a major part of a maximum extent obtainable over the replicas and designating these transformed signals as output signals.

10. A method according to claim 1 wherein the at least one elementary paraunitary matrix implements at least one leading delay, rotation and terminal delay.

11. Computer apparatus for strong decorrelation of signals, the apparatus being programmed for reception of input signals derived by means of a receiver system with sensor means, and also being programmed:
a) to process the input signals to determine delay and rotation parameters which implement at least one elementary paraunitary matrix and transform the input signals into output signals to obtain improvement in a measure of strong decorrelation;
b) to assess the improvement in the measure of strong decorrelation,
c) if the improvement is significant to designate the output signals as input signals and iterate a) and b), and if the improvement is not significant to designate the output signals as signals decorrelated in a wide sense; and
d) to make the signals decorrelated in a wide sense available for use as one of separated signals and pre-processed signals for input to another process.

12. Apparatus according to claim 11 wherein the delay and rotation parameters which transform the input signals characterise a single elementary paraunitary matrix.

13. Apparatus according to claim 12 programmed to produce a paraunitary matrix by cumulatively multiplying successive elementary paraunitary matrices produced in iterative processing.

14. Apparatus according to claim 12 wherein the range of signal delay parameters is a set of discrete delay vectors, and the computer apparatus is programmed to determine the delay and rotation parameters by generating a respective version of the input signals delayed by each delay vector in the set, and to find for each version rotation parameters which at least approach producing maximisation of output signals' strong decorrelation.

15. Apparatus according to claim 14 programmed to determine the rotation parameters which at least approach producing maximisation of output signals' strong decorrelation using a pointwise decorrelation algorithm.

16. Apparatus according to claim 11 programmed to receive n input signals where n is an integer greater than 2, and also programmed to determine delay and rotation parameters which implement at least one elementary paraunitary matrix providing for rotation of a pair of input signals and relative delay of the or as the case may be each other input signal.

17. Apparatus according to claim 16 programmed to define respective channels for the n input signals and to process the input signals in n(n−1)/2 successive stages each associated with at least one respective elementary paraunitary matrix and each providing for rotation of signals associated with a respective pair of channels and provision of relative delay associated with the or as the case may be each other channel, the first such stage involving processing the input signals and the or as the case may be each subsequent stage involving processing signals resulting from processing in the respective preceding stage.

18. Apparatus according to claim 11 programmed to receive a set of n input signals where n is an integer greater than 2, and also programmed to:
a) produce n(n−1)/2 replicas of the set of input signals,
b) in each replica select a respective signal pair differing to that selected in other replicas, and
c) implement processing of the input signals to determine delay and rotation parameters for each replica as input signals and determine:
   i) delay and rotation parameters which implement at least one elementary paraunitary matrix providing for rotation of the respective selected signal pair only, and
   ii) which replica when transformed by the associated at least one elementary paraunitary matrix gives rise to transformed signals corresponding to improvement in a measure of strong decorrelation by at least a major part of a maximum extent obtainable over the replicas and designate these transformed signals as output signals.

19. Apparatus according to claim 11 wherein the at least one elementary paraunitary matrix implements at least one leading delay, rotation and terminal delay.

20. A computer readable medium encoded with a computer program for implementing strong decorrelation of signals derived by means of a receiver system with sensor means and input to computer apparatus by controlling the computer apparatus:
a) to process the input signals to determine delay and rotation parameters which implement at least one elementary paraunitary matrix and transform the input signals into output signals to obtain improvement in a measure of strong decorrelation;
b) to assess the improvement in the measure of strong decorrelation,
c) if it is significant to designate the output signals as input signals and iterate a) and b), and if the improvement is not significant to designate the output signals as signals decorrelated in a wide sense; and
d) to make the signals decorrelated in a wide sense available for use as one of separated signals and pre-processed signals for input to another process.

21. A computer readable medium according to claim 20 wherein the delay and rotation parameters which transform the input signals characterise a single elementary paraunitary matrix.

22. A computer readable medium according to claim 21 wherein the instructions provide for control of computer apparatus to implement the step of producing a paraunitary matrix by cumulatively multiplying successive elementary paraunitary matrices produced by iterating processing of the input signals to determine delay and rotation parameters.

23. A computer readable medium according to claim 21 the range of signal delay parameters is a set of discrete delay vectors, and the instructions provide for the delay and rotation parameters to be determined by generating a respective version of the input signals delayed by each delay vector in the set, and for each version finding rotation parameters which at least approach producing maximisation of output signals' strong decorrelation.

24. A computer readable medium according to claim 23 wherein the instructions provide for the rotation parameters which at least approach producing maximisation of output signals' strong decorrelation to be determined using a pointwise decorrelation algorithm.

25. A computer readable medium according to claim 20 wherein the instructions provide for control of computer apparatus to receive n input signals where n is an integer greater than 2, and to provide for processing the input signals to determine delay and rotation parameters to comprise determining such parameters which implement at least one elementary paraunitary matrix providing for rotation of a pair of input signals and relative delay of the or as the case may be each other input signal.

26. A computer readable medium according to claim 25 wherein the instructions provide for respective channels to be defined for the n input signals and also for processing the input signals to determine delay and rotation parameters to have n(n−1)/2 successive stages each associated with at least one respective elementary paraunitary matrix and each providing for rotation of signals associated with a respective pair of channels and provision of relative delay associated with the or as the case may be each other channel, the first stage being arranged to process the input signals and the or as the case may be each subsequent stage being arranged to receive signals processed in the respective preceding stage.

27. A computer readable medium according to claim 22 wherein the instructions provide for control of computer apparatus to receive a set of n input signals where n is an integer greater than 2, and for controlling the computer apparatus to:
 a) produce n(n−1)/2 replicas of the set of input signals,
 b) in each replica select a respective signal pair differing to that selected in other replicas, and
 c) carry out processing of determine delay and rotation parameters for each replica as input signals by:
  i) determining delay and rotation parameters which implement at least one elementary paraunitary matrix providing for rotation of the respective selected signal pair only, and
  ii) determining which replica when transformed by the associated at least one elementary paraunitary matrix gives rise to transformed signals corresponding to improvement in a measure of strong decorrelation by at least a major part of a maximum extent obtainable over the replicas and designating these transformed signals as output signals.

28. A computer according to claim 22 wherein the at least one elementary paraunitary matrix implements at least one leading delay, rotation and terminal delay.

* * * * *